US009595082B2

(12) United States Patent
Sasaki

(10) Patent No.: US 9,595,082 B2
(45) Date of Patent: Mar. 14, 2017

(54) IMAGE PROCESSOR AND NON-TRANSITORY COMPUTER READABLE MEDIUM FOR GENERATING A REPRODUCTION IMAGE WHICH IS REPRODUCED SO THAT VISIBILITY OF AN ORIGINAL IMAGE IS ENHANCED

(71) Applicant: FUJI XEROX CO., LTD., Tokyo (JP)

(72) Inventor: Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/188,397

(22) Filed: Jun. 21, 2016

(65) Prior Publication Data

US 2016/0300329 A1    Oct. 13, 2016

Related U.S. Application Data

(62) Division of application No. 14/294,922, filed on Jun. 3, 2014, now Pat. No. 9,418,403.

(30) Foreign Application Priority Data

Oct. 4, 2013 (JP) ................................ 2013-209653
Oct. 4, 2013 (JP) ................................ 2013-209654

(51) Int. Cl.
   *G06K 9/40* (2006.01)
   *G06T 5/00* (2006.01)
   *G06T 5/40* (2006.01)

(52) U.S. Cl.
   CPC .............. *G06T 5/002* (2013.01); *G06T 5/006* (2013.01); *G06T 5/40* (2013.01); *G06T 2207/10024* (2013.01); *G06T 2207/20016* (2013.01)

(58) Field of Classification Search
   CPC ...................................................... G06T 5/007
   (Continued)

(56) References Cited

U.S. PATENT DOCUMENTS

2001/0038716 A1    11/2001 Tsuchiya et al.
2003/0052979 A1     3/2003 Soga et al.
(Continued)

FOREIGN PATENT DOCUMENTS

JP    2001-298621 A    10/2001
JP    2003-076984 A     3/2003
(Continued)

OTHER PUBLICATIONS

Ron Kimmel et al., Á Variational Framework for Retinex, International Journal of Computer Vision, 2003, vol. 52, No. 1, pp. 7-23.
(Continued)

*Primary Examiner* — Andrew Moyer
(74) *Attorney, Agent, or Firm* — Sughrue Mion, PLLC

(57) ABSTRACT

An image processor includes: an image group generating unit that generates, from an original image, a group of images including at least one smoothed image; an illumination image generating unit that generates an illumination image by use of at least one of the images included in the group of images; a smoothed image acquiring unit that acquires a particular smoothed image based on the at least one smoothed image; a reflection rate image generating unit that generates a reflection rate image based on the original image, the particular smoothed image, a synthesizing degree information which represents a synthesizing degree of the original image and the particular smoothed image, and the illumination image, and a reproduction image generating unit that generates a reproduction image which is repro-
(Continued)

duced so that visibility of the original image is enhanced, based on at least the reflection rate image and an enhancing degree information.

5 Claims, 24 Drawing Sheets

(58) Field of Classification Search
USPC .......................................................... 382/274
See application file for complete search history.

(56) References Cited

U.S. PATENT DOCUMENTS

| 2007/0047835 | A1 | 3/2007 | Kondo |
| 2009/0073278 | A1 | 3/2009 | Ogawa et al. |
| 2011/0206293 | A1 | 8/2011 | Sasaki |

FOREIGN PATENT DOCUMENTS

| JP | 2003-248824 A | 9/2003 |
| JP | 2006-155595 A | 6/2006 |
| JP | 2007-067746 A | 3/2007 |
| JP | 2009-071621 A | 4/2009 |
| JP | 2011-170717 A | 9/2011 |

OTHER PUBLICATIONS

Go Tanaka et al., "Multiscale image enhancement employing S-shape functions", Journal of the Institute of Electronics, Information and Communication Engineers, 2008, pp. 1684-1688, vol. J91-D, No. 6.

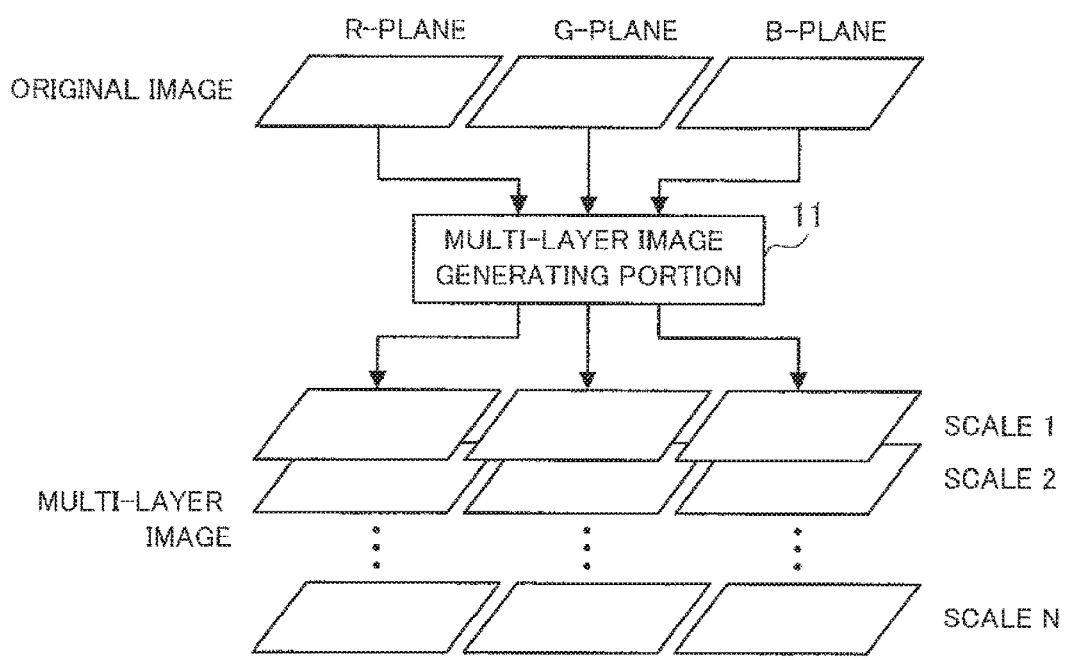

σ = SMALL

σ = MIDDLE

σ = LARGE

IMAGE PROCESSOR AND NON-TRANSITORY COMPUTER READABLE MEDIUM FOR GENERATING A REPRODUCTION IMAGE WHICH IS REPRODUCED SO THAT VISIBILITY OF AN ORIGINAL IMAGE IS ENHANCED

CROSS REFERENCE TO RELATED APPLICATIONS

This application is a Divisional of U.S. patent application Ser. No. 14/294,922, filed on Jun. 3, 2014, which claims priority Japanese Patent Applications Nos. 2013-209653 filed Oct. 4, 2013 and 2013-209654 filed Oct. 4, 2013, respectively, the contents of all of which are incorporated herein by reference in their entirety.

BACKGROUND

Technical Field

The present invention relates to an image processor and a non-transitory computer readable medium.

Related Art

Recently, various image processing techniques have been known in which distortion of an image having been subjected to a processing for enhancing the image is suppressed.

SUMMARY

According to an aspect of the present invention, there is provided an image processor including: an image group generating unit that generates, from an original image, a group of images including at least one smoothed image which is the original image smoothed with at least one smoothing degree; an illumination image generating unit that generates an illumination image in which an illumination component of the original image is set to be a pixel value by use of at least one of the images included in the group of images; a smoothed image acquiring unit that acquires a particular smoothed image which is the original image smoothed with a smoothing degree for suppressing an occurrence of image distortion, based on the at least one smoothed image; a reflection rate image generating unit that generates a reflection rate image in which a reflection rate component of the original image is set to be a pixel value, based on the original image, the particular smoothed image, a synthesizing degree information which represents a synthesizing degree of the original image and the particular smoothed image, and the illumination image, and a reproduction image generating unit that generates a reproduction image which is reproduced so that visibility of the original image is enhanced, based on at least the reflection rate image and an enhancing degree information which represents an enhancing degree of the reflection rate component of the original image.

BRIEF DESCRIPTION OF THE DRAWINGS

An exemplary embodiment of the present invention will be described in detail based on the following figures, wherein:

FIG. 2 is a diagram showing a generation state of a multi-layer image by a multi-layer image forming portion in the case where an original image is an RGB image;

DETAILED DESCRIPTION

Figure 1:
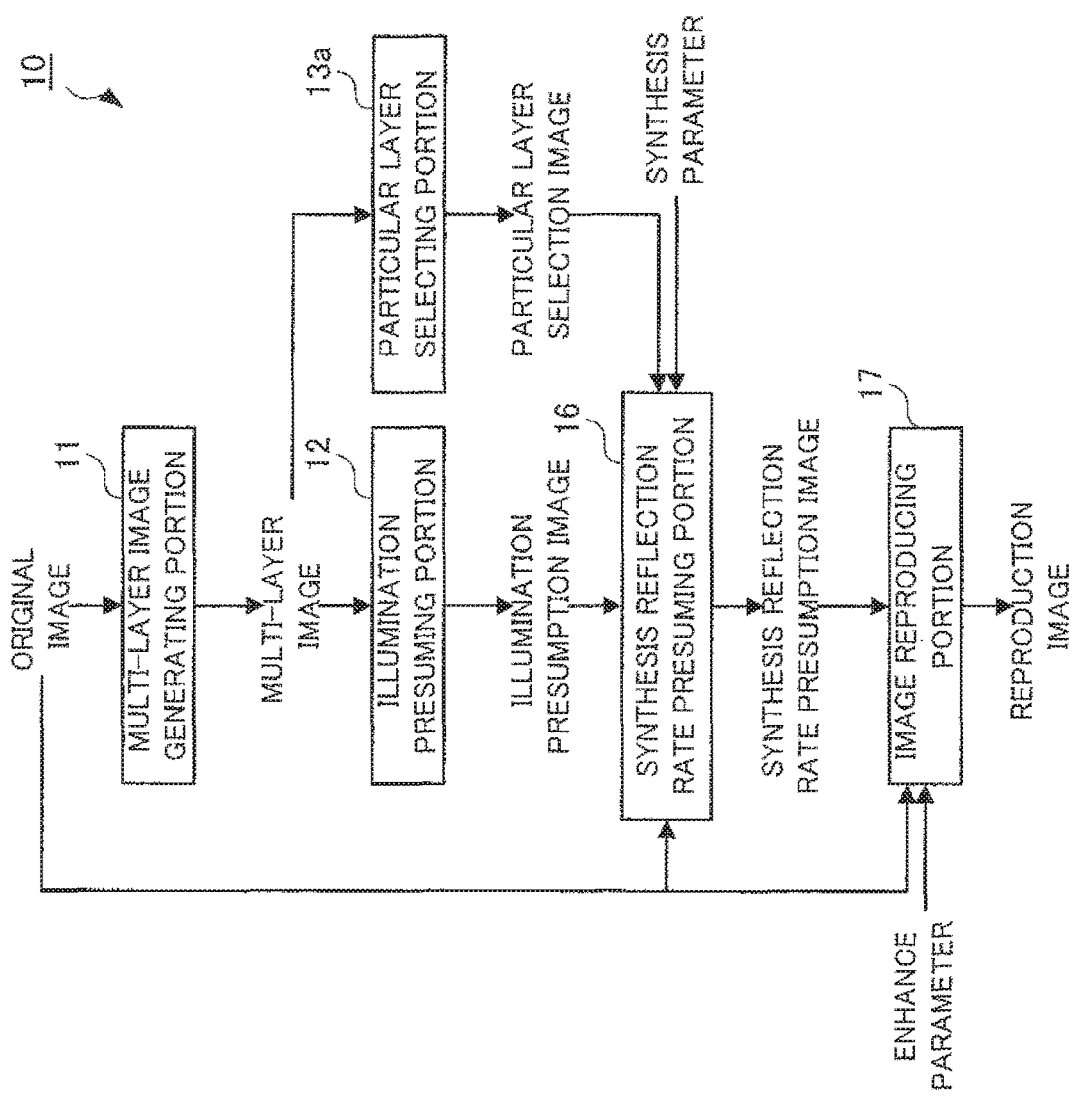
FIG. 1 is a block diagram showing a functional configuration of an image processor in the first exemplary embodiment of the present invention.

Hereinafter, an exemplary embodiment of the present invention will be described in detail with reference to the attached drawings.

BACKGROUND OF INVENTION

We generally use a PC (personal computer) while looking at a monitor to perform an operation of making a document with images. In such a operation, users who use Information and Communication Technology (ICT) devices such as tablet computers and the like having been popular in these days are increased.

In general, change of environmental light scarcely has an effect on the users in an office environment like a place for clerical work or a Desk Top Publishing (DTP) work. On the other hand, while the ICT devices that are comfortably portable have a merit of enabling users to work anywhere, the but ICT devices also have the demerit of being affected by circumstances where the devices are carried, such as change of environmental light.

Further, in an operation of using images, other than the above-described operation of making a document, an operation of storing images which are took by users with a camera-equipped tablet and the like in each device is performed. Such a scene where users share images each other and explain a situation with images have become common.

As described above, "easily usable" and "usable in various places" are provided as a feature of the recent monitor environment, which is different from the conventional monitor environment. In the recent monitor environment, "visibility" is more focused than color adjusting since the using method and the usage environment are different from those in conventional monitor environment.

"Visibility" represents a feature of whether a visual object is clearly seen or not. Basic methods of a field of image processing represented by Gamma correction, histogram equalization, dynamic range compression and the like are provided as a method for improving visibility of an image.

In gamma correction, a curve which heaps up dark sections and an objective region is generated and is applied to pixel values, thereby, the dark sections get brighter. In histogram equalization, a curve which removes a bias of a histogram of an image is generated and is applied to pixel values, thereby; a reproduction of smoothing the histogram is performed. In dynamic range compression, a low brightness and a high brightness are represented without lowering a contrast by changing a correction amount in accordance with an ambient luminance of the image.

There is a method employing Retinex principle among methods for improving visibility utilizing a visual feature. Retinex principle is a basic principle for improving visibility by enhancing the reflection rate components based on the idea that a human perceives scenes by a reflection rate.

However, in general, there is a subject to be addressed that the noise in dark sections or the noise in a particular region is enhanced when the visibility is increased.

Therefore, in the first and second exemplary embodiments, the noise in dark sections or in the particular region in which the noise tends to stand out are suppressed when visibility of an entire image is increased by enhancing reflectation rate components of the image.

Furthermore, improvement of texture of the image and the like at the time of displaying or drawing the image is also required associated with performance advances of cameras equipped on ICT devices. The texture of the image is a field in which studies such as recognition thereof or the like are active in recent years.

Here, in an image processing, texture improvement of a natural image and the like often represents a range-enhancing. In convention, "edge-enhancing" in which high-frequency components are the object has been popular as a range-enhancing. With this edge-enhancing, sharp impression is provided to the pictured object. However, it is not only enhancement of high-frequency components that contributes to improving texture. For example, roughly speaking, in the case of giving texture to an object itself, enhancing mid-frequency components and the like is also considered. As described above, a selection of range is an important factor for texture improvement.

On the other hand, a general method for improving texture is to raise contrast, sharpness or the like. For example, in convention, raising both of contrast and sharpness has been considered. However, it is not a method for improving visibility based on a visual feature or performing an image enhancing in plural ranges.

Therefore, in the third and fourth exemplary embodiments, image enhancing in the range from low-frequency to high-frequency may be controlled when visibility is improved based on a visual feature of a human.

First Exemplary Embodiment

FIG. 1 is a block diagram showing a functional configuration of an image processor 10 in the first exemplary embodiment of the present invention. As shown in the figure, the image processor 10 in the first exemplary embodiment includes; a multi-layer image generating portion 11, an illumination presuming portion 12, a particular layer selecting portion 13a, a synthesis reflection rate presuming portion 16, and an image reproducing portion 17.

The multi-layer image generating portion 11 mainly executes a processing in which an original image is smoothed to generate a smoothed image. This processing is performed for presuming a reflection rate and removing a noise, which will be described later. Smoothness is, for example, executed by performing Moving-average method or convolution represented by Gaussian function as described below.

$$G(x, y) = k \exp\left(-\frac{x^2 + y^2}{\sigma^2}\right) \qquad \text{(Formula 1)}$$

Here, x and y represent a pixel position, k represents a coefficient which is for normalizing the result of the integration with respect to the pixel amount of a filter size of the image processing into 1, and σ represents a degree of smoothness (scale). Note that, the above function is an example, and any filters may be used as long as an image is smoothed as a result. For example, a bilateral filter known as a smoothing filter for edge-storing, which is a filter of a function transformed from Formula 1, may be used.

Figure 3A:
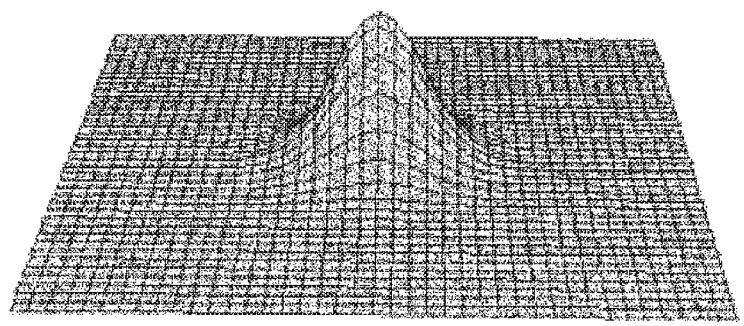
FIGS. 3A to 3C are diagrams showing that a frequency of an image in each layer of the multi-layer is different from each other in accordance with a value σ.
Figure 3B:
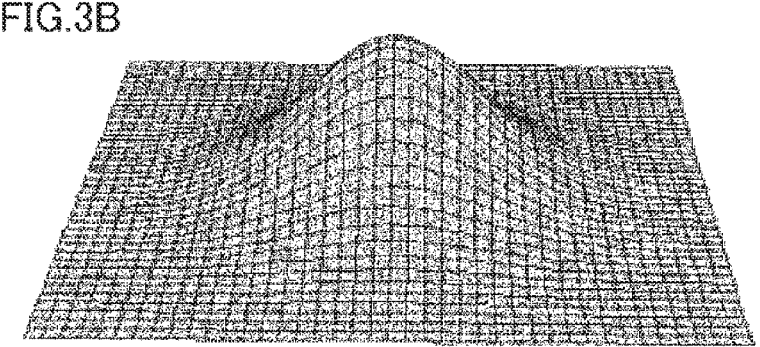
Figure 3C:
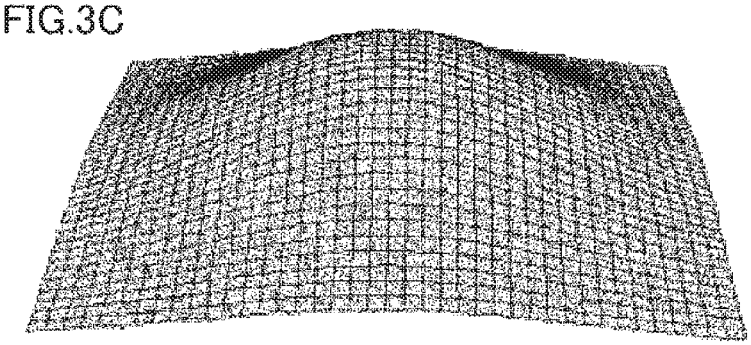

A generation state of the multi-layer image by the multi-layer image generating portion 11 is shown in FIG. 2. FIG. 2 illustrates a specific example of generating an image configured with N layers which are a scale 1 to a scale N as a multi-layer image, in the case where an original image is configured with three planes of RGB. Here, the layers, a scale 1, a scale 2, . . . , a scale N, are obtained by changing σ of Formula 1. As shown in FIG. 3A to FIG. 3C, frequency of the image changes when σ is changed. Specifically, the frequency becomes high when σ is small as shown in FIG. 3A, the frequency becomes low when σ is large as shown in FIG. 3C, and the frequency becomes about middle degree when σ is middle degree as shown in FIG. 3B.

Figure 4:
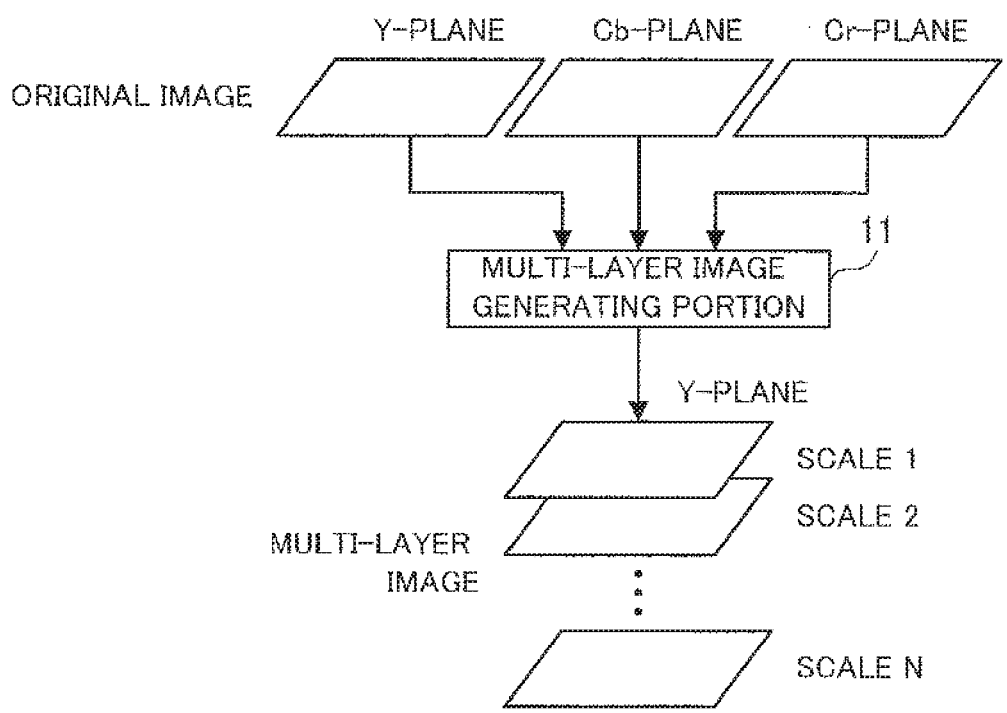
FIG. 4 is a diagram showing a generation state of a multi-layer image by a multi-layer image forming portion in the case where an original image is a brightness chromaticity image.

As described above, the multi-layer image may be N layers converted from three planes of RGB, however, the multi-layer image may be the one as shown FIG. 4. FIG. 4 illustrates a specific example of converting a RGB image into a brightness chromaticity image like a YCbCr image in advance, and in this specific example, only the one plane of Y that represents brightness is converted into a multi-layer image. This is because there is a case where the illumination components are presumed by using only brightness. Note that, here, YCbCr color space is used as a color space represented with brightness chromaticity, however, L*a*b* color space, HSV color space, or the like (however, HS is converted to chromaticity coordinates) may be used. In the case where L*a*b* color space is used, L* may be used as a brightness image, and in the case where HSV color space is used, V may be used as a brightness image.

Moreover, the original image itself may be included as one layer of the multi-layer image. This will be described later.

In the present exemplary embodiment, the multi-layer image is used as an example of a group of images including at least one smoothed image, and the multi-layer image generating portion 11 is provided as an example of an image group generating unit that generates the group of images from the original image.

The illumination presuming portion 12 presumes illumination components of an original image by using at least one image of the multi-layer image (hereinafter, the image of this presumed illumination components is referred to as "illumination presumption image"). According to Retinex principle, it is known that the visual feature of a human presumes the illumination light from surroundings of the observed region. Thus, a smoothed image represents the presumed illumination light. However, since the suitable scale depends on scenes, for example, it is preferable to give the weighted sum of the image configured with the N layers, which includes each of a scale 1 to a scale N, to presume the illumination light as below.

$$L(x, y) = \sum_{n=1}^{N} W_n G_n(x, y) \otimes I(x, y) \quad \text{(Formula 2)}$$

Here, L(x, y) represents a pixel value of the illumination presumption image, $G_n$(x, y) represents Formula 1 applied to the scale n, I(x, y) represents a pixel value of the original image, $W_n$ represents a bias of the scale n, and "x" circled by "o" represents convolution. Note that, $W_n$ may be simply given 1/N, or $W_n$ may be variable in accordance with layers as well.

Figure 5:
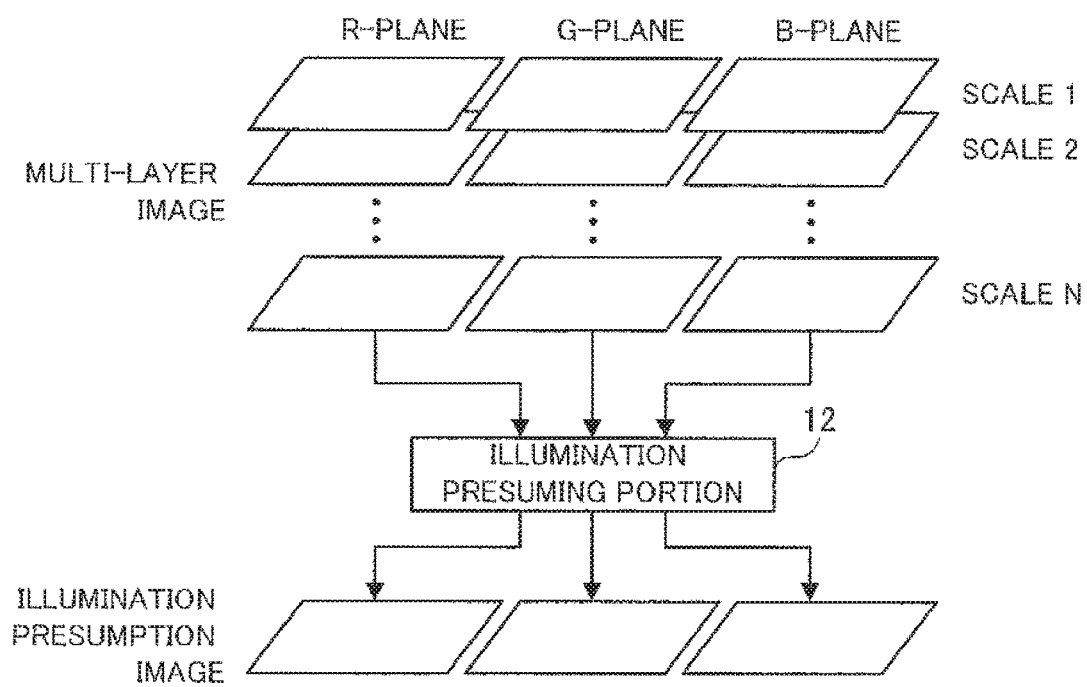
FIG. 5 is a diagram showing a presumption state of an illumination light by an illumination presuming portion in the case where the multi-layer image is configured with three planes of RGB.

A presumption state of an illumination light by the illumination presuming portion 12 in the case where the multi-layer image generating portion 11 generates the multi-layer image as in FIG. 2 is shown in FIG. 5. In this case, since the Formula 2 is applied to the three planes of RGB, the Formula 2 is apprehended as below.

$$L_R(x, y) = \sum_{n=1}^{N} W_n G_n(x, y) \otimes I_R(x, y) \quad \text{(Formula 3)}$$

$$L_G(x, y) = \sum_{n=1}^{N} W_n G_n(x, y) \otimes I_G(x, y)$$

$$L_B(x, y) = \sum_{n=1}^{N} W_n G_n(x, y) \otimes I_B(x, y)$$

Here, each of $L_R$(x, y), $L_G$(x, y), and $L_B$(x, y) respectively represents a value of R, a value of G, and a value of B in a pixel of the illumination presumption image, and each of $I_R$(x, y), $I_G$(x, y), and $I_B$(x, y) respectively represents a value of R, a value of G, and a value of B in a pixel of the original image.

Figure 6:
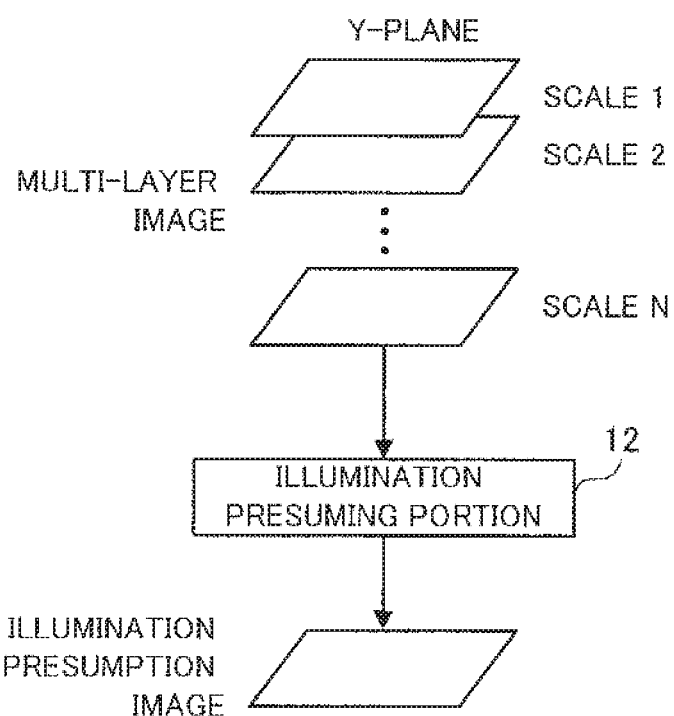
FIG. 6 is a diagram showing a presumption state of an illumination light by an illumination presuming portion in the case where the multi-layer image is configured with one plane of brightness.

A presumption state of an illumination light by the illumination presuming portion 12 in the case where the multi-layer image generating portion 11 generates the multi-layer image as in FIG. 4 is shown in FIG. 6. In this case, Formula 2 is apprehended as below.

$$L_Y(x, y) = \sum_{n=1}^{N} W_n G_n(x, y) \otimes I_Y(x, y) \quad \text{(Formula 4)}$$

Here, $L_Y$(x, y) represents a brightness value of a pixel of the illumination presumption image, and $I_Y$(x, y) represents a brightness value of a pixel of the original image.

As described above, in the illumination presuming portion 12, the image configured with N layers of the scale 1 to the scale N is used while supposing that N≥1. Further, the image configured with N layers is defined as below.

At least an image of one layer among the N layers is smoothed.

An image of one layer among the N layers may be the original image itself. In this case, the weighted sum may be given by adding the original image or excluding the original image in Formula 3 and Formula 4.

In the case of N≥2, the illumination light is presumed from at least an image of one layer among the N layers. In the case of N=1, an image of one layer itself is set to be the illumination presumption image.

Figure 7:
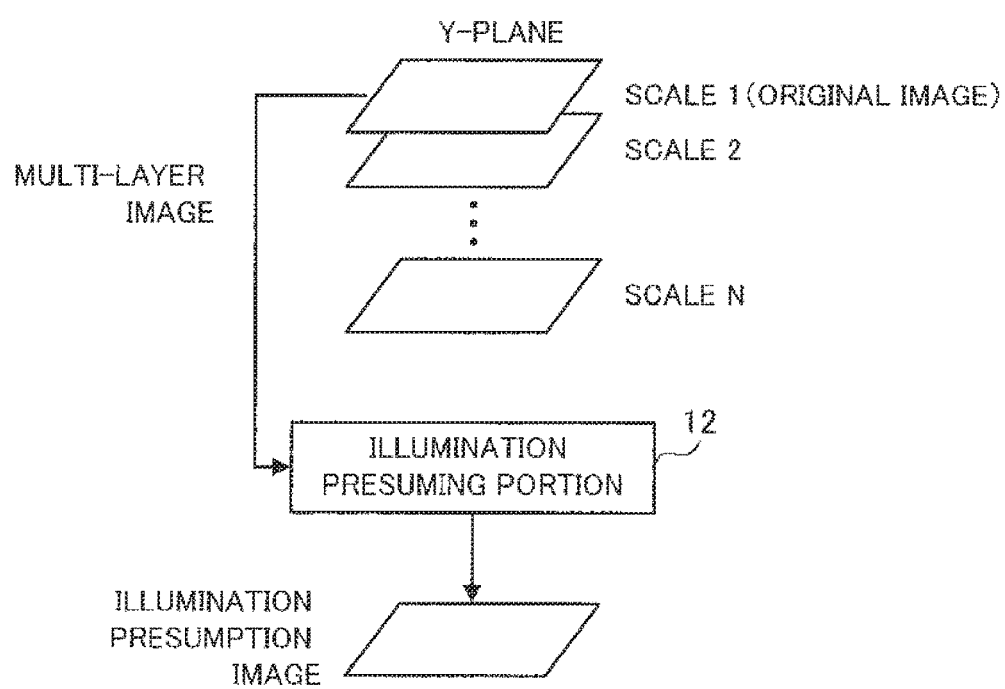
FIG. 7 is a diagram showing a presumption state of an illumination light by an illumination presuming portion in the case where the original image is included in the multi-layer image.

Further, in the case where the original image itself is included as an image of one layer of the multi-layer image, the illumination light may be presumed as in FIG. 7. FIG. 7 illustrates another example of a presumption of the illumination light in the case where the only one plane of Y representing brightness is converted into the multi-layer image, which is a specific example different from FIG. 6. Such a presumption of the illumination light may be performed by utilising the techniques disclosed in a document "R. Kimmel, M. Elad, D. Shaked, R. Keshet, and I. Sobel, "A variational framework for retinex," Int. J. Comput. Vis., vol. 52, no. 1, pp 7-23, January 2003". That is, the method disclosed in the above document that, the illumination component L itself is set at unknown, an energy function that represents spatial smoothness of L is defined by using a pixel value I (known) of the original image, and the solution is calculated by taking the energy function as Second-order programming problem of L, may be used to figure out L. For example, on the assumption that the illumination light is smooth in space, the energy function of L in which the smoothness is regarded as E is defined as below.

$$E(L) = \iint (\log L(x,y))^2 + a(\log L(x,y) - \log I(x,y))^2 + b|\nabla(\log L(x,y) - \log I(x,y))^2|)dxdy$$

Here, a and b are parameters for controlling smoothness. It is possible to analytically solve as a Second-order programming problem because E(L) is a second-order expression of log L(x, y). Otherwise, any other analytical methods publicly known may be applied.

In the present exemplary embodiment, the illumination presumption image is used as an example of an illumination image in which the illumination component of the original image is set to be a pixel value, and the illumination presuming portion 12 is provided as an example of an illumination image generating unit that generates the illumination image.

Figure 8:
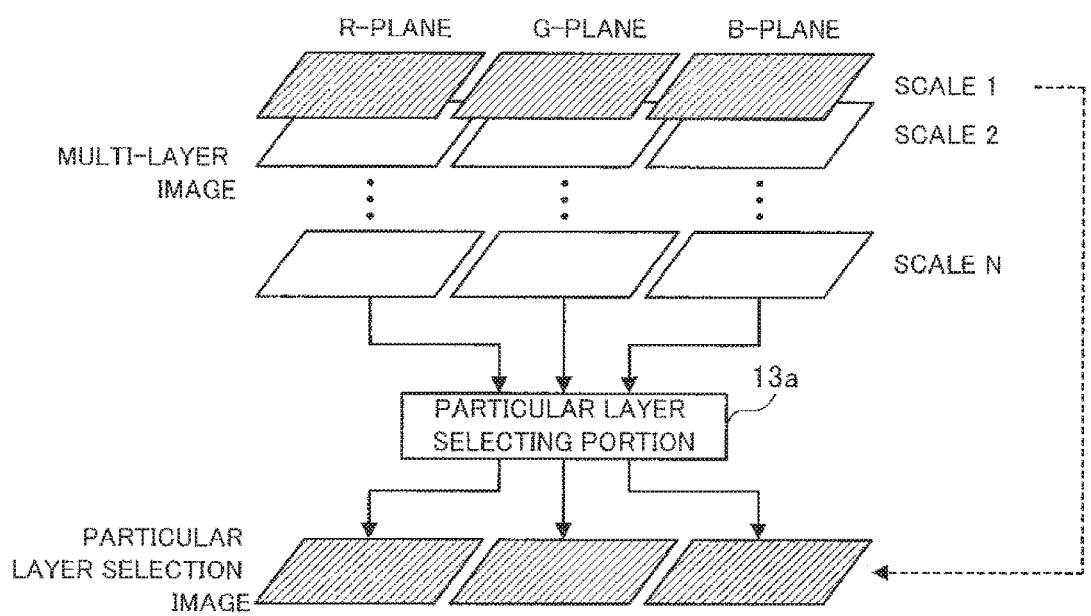
FIG. 8 is a diagram showing a selection state of a particular layer by a particular layer selecting portion in the case where the multi-layer image is configured with three planes of RGB.

The particular layer selecting portion 13a selects, from the multi-layer image, an image of a layer for removing the noise thereof (image distortion) (hereinafter, the image in the selected layer is referred to as "a particular selection image"). For example, the selection state of the particular layer selection image from the multi-layer image in FIG. 2 is shown in FIG. 8. The layer of the scale 1 is a selected layer for removing the noise thereof as shown in FIG. 8 with slash-hutching. Since a layer in which a large value is set to σ is usually used for the illumination presumption, σ of a layer for removing the noise thereof may be set at a smaller value than σ of the layers for performing the illumination presumption which are the scale 2 to the scale N. In this case, the layers of the scale 1 to the scale N may be used or the layers of the scale 2 to the scale N may be used for the illumination presumption. In other words, a layer for removing the noise thereof may or may not be used for the illumination presumption.

Here, when the layer of the scale 1 is a layer for removing the noise thereof, a suitable value for removing the noise may be prepared in advance as the value of σ for generating the layer of the scale 1 (as described above, the value of σ is preferably smaller).

On the other hand, the multi-layer image generating portion 11 may determine σ for the noise removal in accordance with the generation situation of the noise in the image in order to perform the more accurate noise removal. In this case, for example, high-frequency components are calculated from the original image by use of the high-frequency detecting filter (Laplacian filter, DOG filter and so on) and the sum of the high-frequency components of the dark section region may be regarded as the noise index, moreover, based on the correspondence between the noise index previously experimentally acquired and the suitable value of σ for the noise removal, the multi-layer image generating portion 11 may flexibly acquire the suitable value of σ for the noise removal.

Figure 9:
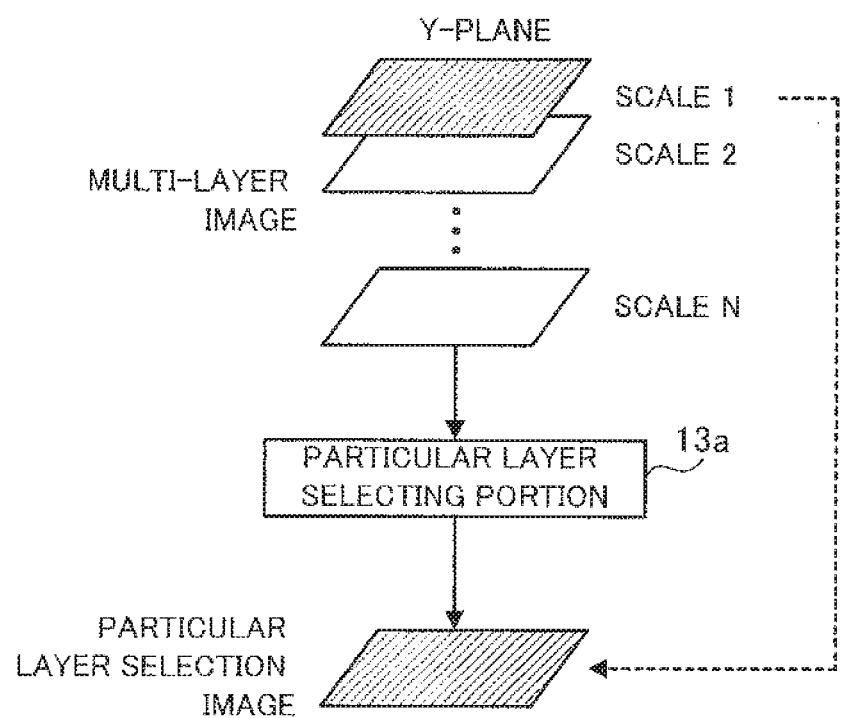
FIG. 9 is a diagram showing a selection state of a particular layer by a particular layer selecting portion in the case where the multi-layer image is configured with one plane of brightness.

A selection state of the particular layer selection image from the multi-layer image shown in FIG. 4 is shown in FIG. 9. The layer of the scale 1 is the selected layer for removing the noise thereof as shown in FIG. 9 with slash-hutching.

Figure 10:
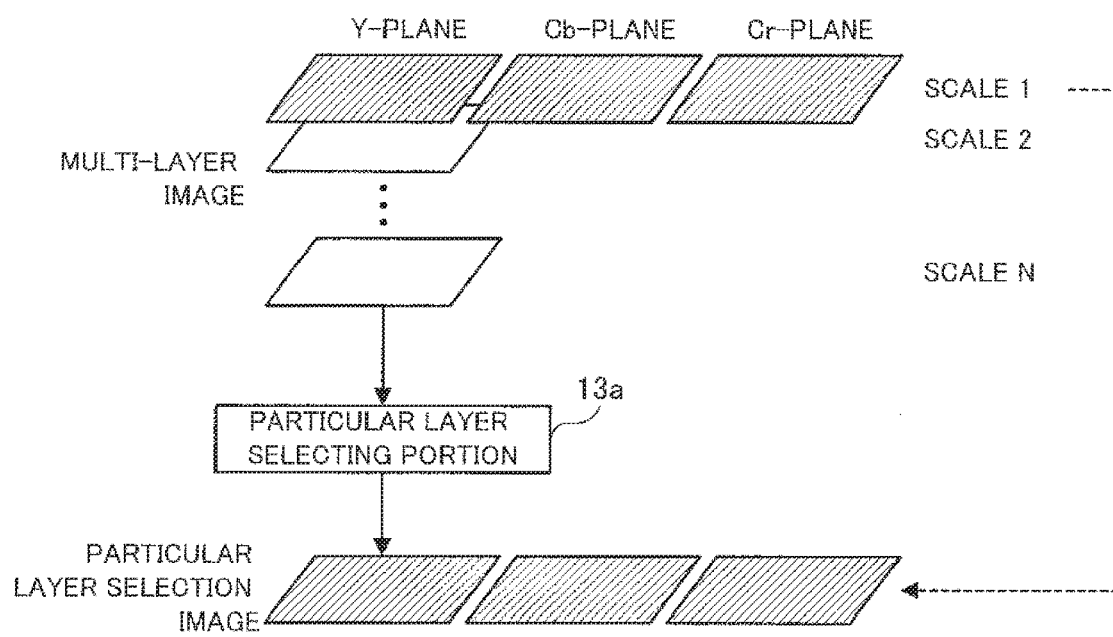
FIG. 10 is a diagram showing a selection state of a particular layer by a particular layer selecting portion in the case where the multi-layer image is configured with one plane of brightness and removes the chromaticity noise as well as the brightness noise.

It may be performed in such a manner in the case of removing only the noise of brightness, however, it may be performed as shown in FIG. 10 in the case of further removing the noises of chromaticity. FIG. 10 illustrates with slash-hutching that, as to only the layers for removing the noise, the same smoothness as the Y-plane is performed to the planes (Cb, Cr-plane) of chromaticity components, and illustrates a selection state of the layer in which the planes of chromaticity components are also smoothed by the particular layer selecting portion 13a.

Note that, it is described above that the particular layer selecting portion 13a selects one layer from the multi-layer image generated by the multi-layer image generating portion 11 and the selected layer is set to be a layer for removing the noise thereof, however, it is not limited thereto. For example, the particular layer selecting portion 13a selects plural layers from the multi-layer image generated by the multi-layer image generating portion 11, and one layer may be generated from the plural layers to be set a layer for removing the noise thereof. Otherwise, a particular layer generating portion which generates a layer for removing the noise from the original image may be provided, instead of the particular layer selecting portion 13a which selects a layer for removing the noise from the multi-layer image generated by the multi-layer image generating portion 11. In this manner, the particular layer selecting portion 13a is regarded as a unit acquiring a layer for removing the noise thereof.

In the present exemplary embodiment, the particular layer selection image is used as an example of a particular smoothed image in which an original image is smoothed with the degree of smoothness for suppressing the occurrence of the image distortion, and the particular layer selecting portion 13a is provided as an example of a smoothed image acquiring unit that acquires the particular smoothed image.

The synthesis reflection rate presuming portion 16 presumes a reflection rate of the original image synthesizing the illumination presumption image with the particular layer selection image. Specifically, the image (hereinafter, referred to as "a synthesis reflection rate presumption image") which is synthesized with the particular layer selection image and represents the reflection rate is figured out as below.

$$R(x, y) = \frac{wI(x, y) + (1 - w)L^{NR}(x, y)}{L(x, y)} \quad \text{(Formula 5)}$$

Here, R(x, y) represents a pixel value of the synthesis reflection rate presumption image, L(x, y) represents a pixel value of the illumination presumption image, and $L^{NR}(x, y)$ represents a pixel value of the particular layer selection image. Moreover, w represents a weighted value of 0 to 1 and corresponds to the synthesis parameter (a synthesizing degree information) in FIG. 1. Thereby, the reflection rate corresponding to the region weighted with the pixel values of the original image and the reflection rate corresponding to the region weighted with the noise removal are respectively calculated. Note that, in the case where the illumination presumption image is calculated by respectively using the three planes of RGB, it is interpreted that each R(x,y) of the three planes of RGB is respectively figured out in Formula 5.

Figure 11:
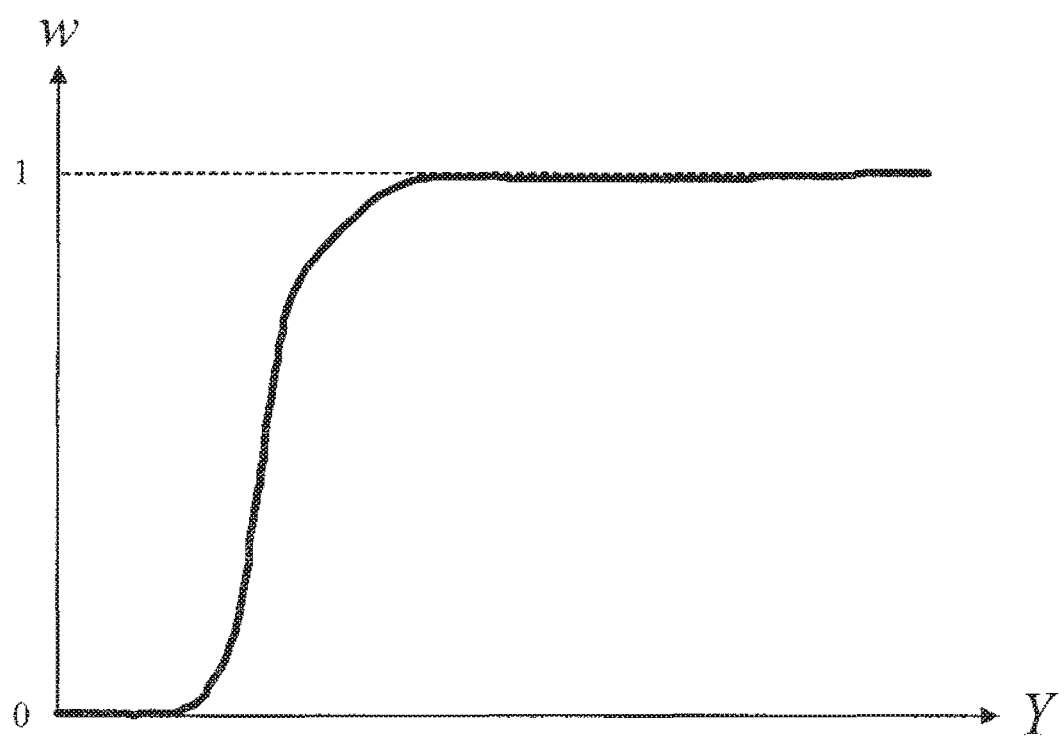
FIG. 11 is a graph showing a function defining a synthesis parameter used in the first exemplary embodiment of the present invention.

Further, it is possible to deal with the noise of dark sections by regarding w as the function corresponding to brightness shown in FIG. 11. For example, the shape of FIG. 11 is realized with the below-described formula.

$$w = 1 - \frac{1}{1 + \left(\frac{Y}{Y_{inf}}\right)^p} \quad \text{(Formula 6)}$$

Here, $Y_{inf}$ represents an inflection point of the function, and p represents a parameter for controlling the maximum gradient.

Note that, Y represents brightness in FIG. 11. In this case, brightness may be Y of YCbCr, or values of averaged summations of each value of RGB. In other words, brightness may be values calculated in any calculating manner as long as representing lightness.

In the present exemplary embodiment, the synthesis reflection rate presumption image is used as an example of a reflection rate image in which the reflection rate component of the original image is set to be a pixel value, and the synthesis reflection rate presuming portion 16 is provided as an example of a reflection rate image generating unit that generates the reflection rate image.

The image reproducing portion 17 executes a processing for enhancing reflection rate components based on an original image and the synthesis reflection rate presumption image generated by the synthesis reflection rate presuming portion 16. For example, the reproduction image in which the reflection rate components are enhanced is generated by the below-described reproduction formula.

$$\hat{I}(x,y) = \alpha R(x,y) + (1-\alpha)I(x,y) \quad \text{(Formula 7)}$$

Here, $\hat{I}(x, y)$ represents a pixel value of the reproduction image. Moreover, α is a parameter representing the enhancing degree and corresponds to the enhance parameter (enhancing degree information) in FIG. 1. $\hat{I}(x, y)$ is a reflection rate component itself in the case of α=1, and $\hat{I}(x, y)$ is a pixel value of the original image in the case of α=0. In the exemplary embodiment, α may be any value from 0 to 1. Note that, a hat sign is attached at the top of a symbol in a formula, however, it is attached at the right side of a symbol in this specification.

Moreover, the reproduction formula is not limited to Formula 7, and the reproduction formula may be as described below.

$$\hat{I}(x,y) = \alpha \log(R(x,y)) + \beta \quad \text{(Formula 8)}$$

Here, α is a parameter representing a gain of the reflection degree, and β is a parameter representing an intercept of the reproduction formula. FIG. 1 shows the case where the image reproducing portion 17 generates the reproduction image by using the original image, however, in the case of applying Formula 8, the image reproducing portion 17 generates the reproduction image without using the original image. Further, α corresponds to the enhancing parameter in FIG. 1, while β is a parameter which is not shown in FIG. 1.

Note that, in the present exemplary embodiment, the image reproducing portion 17 reproduces an image by applying Formula 7 or Formula 8, however, the image may be reproduced as long as applying any formulas which enhances the reflection rate.

In the present exemplary embodiment, the image reproducing portion 17 is provided as an example of a reproduction image generation unit that generates the reproduction image.

In the case where each of the synthesis reflection rate presumption images of the three planes of RGB is calculated, a reproduction formula such as Formula 7, Formula 8 may be used for each of the three planes. However, in the case where the synthesis reflection rate presumption image of one plane of brightness is calculated by using YCbCr, L*a*b*, HSV and the like, a reproduction formula such as Formula 7, Formula 8, and the like may be used for one plane of brightness. In this case, the reproduction images of RGB may be generated by using the original image itself as CbCr of chromaticity components and converting YCbCr to RGB.

Figure 12:
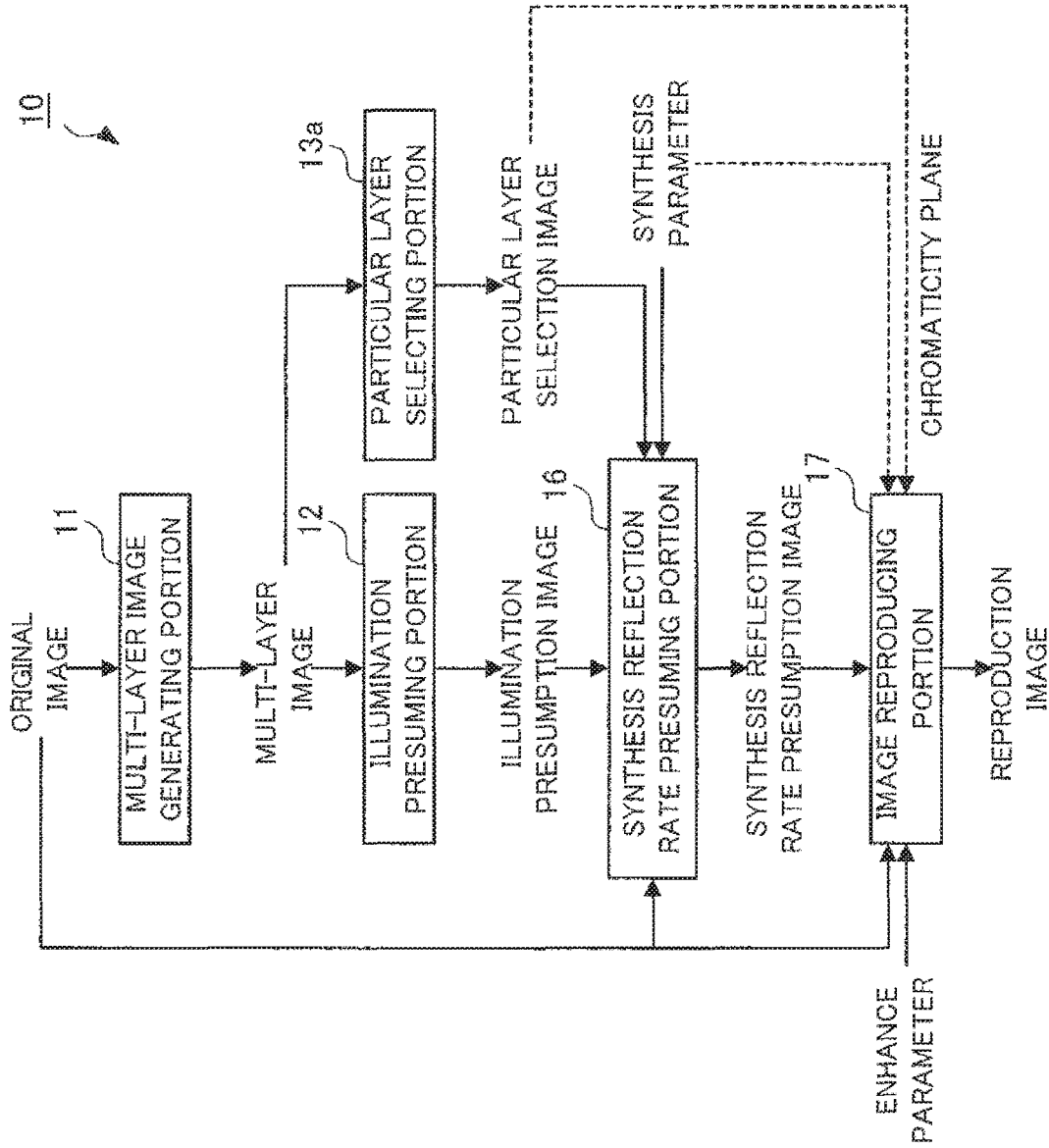
FIG. 12 is a block diagram changing the functional configuration of the image processor in the first exemplary embodiment of the present invention so as to remove the chromaticity noise.

Therefore, when the brightness chromaticity image is used, for example, in the case of just removing the noise of brightness components, the above-described reproduction may be performed. On the other hand, in the case where the particular layer selection image is prepared for also removing the noise of chromaticity components as shown in FIG. 1, the block diagram shown in FIG. 1 will be like as shown in FIG. 12.

That is, the image reproducing portion 17 calculates chromaticity components of the reproduction image by applying the same synthesis parameter as the one applied in the synthesis reflection rate presumption portion 16 as below.

$$\hat{I}_c(x,y) = wI_c(x,y) + (1-w)I_c^{NR}(x,y) \quad \text{(Formula 9)}$$

Here, $I_C\hat{\,}(x, y)$ represents a chromaticity component of the reproduction image, $I_C(x, y)$ represents a chromaticity component of the original image, and $I_C^{NR}(x, y)$ represents a chromaticity component (a chromaticity plane) of the particular layer selection image. Note that, chromaticity components are those in which CbCr, a*b*, or HS are converted to chromaticity coordinates and the like. As described above, w represents a weighted value (a synthesis parameter) which is 0 to 1. Since chromaticity has two planes, Formula 9 is applied for each of the planes.

Figure 13:
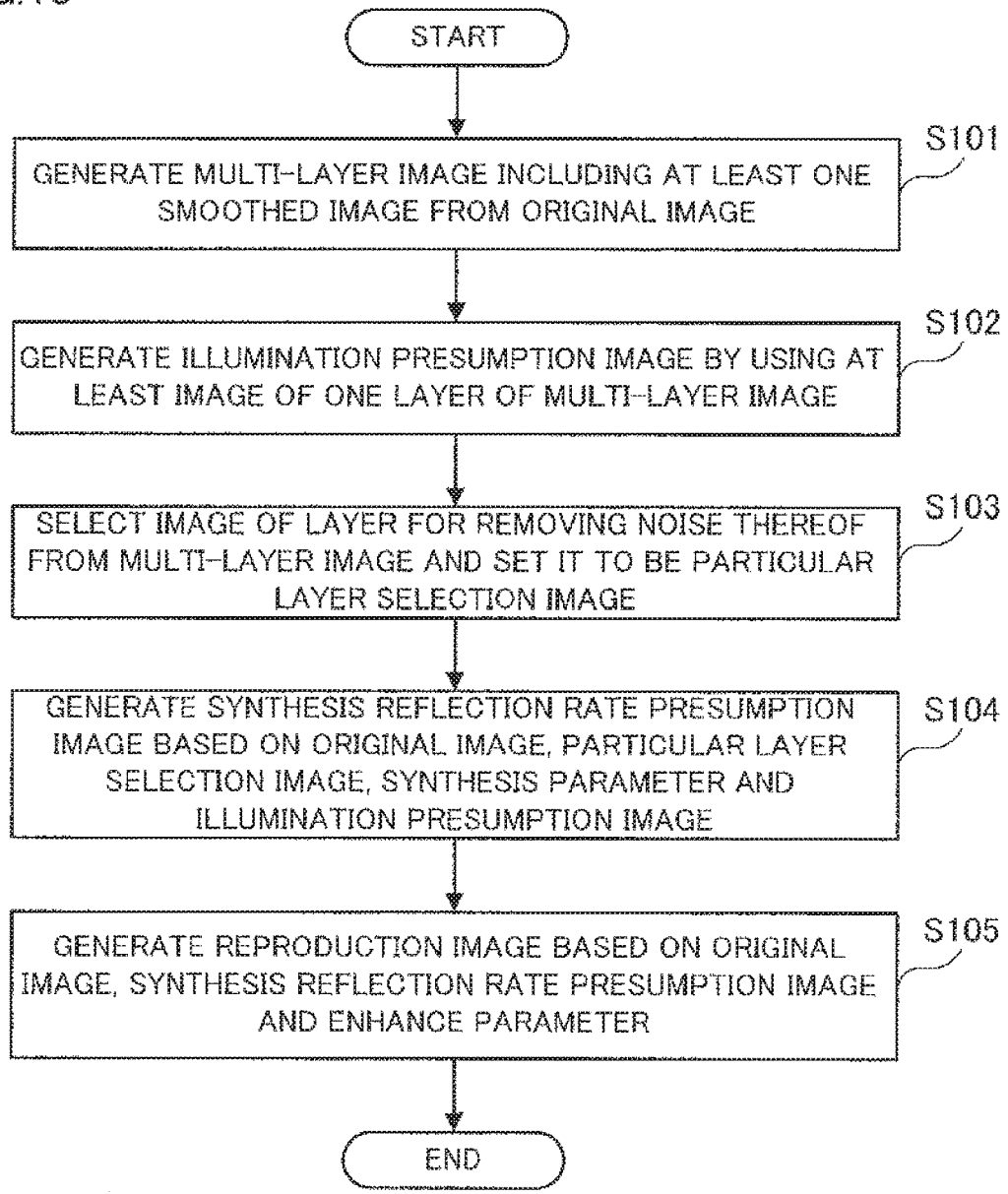
FIG. 13 is a flowchart showing an operation example of the image processor in the first exemplary embodiment of the present invention.

FIG. 13 is a flowchart showing an operation example of the image processor 10 in the first exemplary embodiment of the present invention.

When the original image is inputted, firstly, the multi-layer image generating portion 11 generates a multi-layer image including at least one smoothed image from the original image as shown in FIG. 2 and FIG. 4 (step 101).

Next, the illumination presuming portion 12 generates the illumination presumption image by using at least an image of one layer of the multi-layer image generated in step 101 as shown in FIG. 5 to FIG. 7 (step 102). Moreover, the particular layer selecting portion 13a selects a layer for removing the noise thereof from the multi-layer image generated in step 101, and sets the selected layer to be the particular layer selection image as shown in FIG. 8 to FIG. 10 (step 103). Herein, step 102 and step 103 are performed in this order, however, they may be performed in any orders. Otherwise, step 102 and step 103 may be performed in parallel.

Subsequently, the synthesis reflection rate presuming portion 16 generates the synthesis reflection rate presumption image based on the original image, the particular layer selection image selected in step 103, the synthesis parameter, and the illumination presumption image generated in step 102 (step 104).

Lastly, the image reproducing portion 17 generates the reproduction image based on the original image, the synthesis reflection rate presumption image generated in step 104 and the enhance parameter (step 105). Note that, herein, the original image is used by assuming the case of generating the reproduction image by applying Formula 7, however, in the case of generating the reproduction image by applying Formula 8, the original image may not be used in step 105.

Second Exemplary Embodiment

Figure 14:
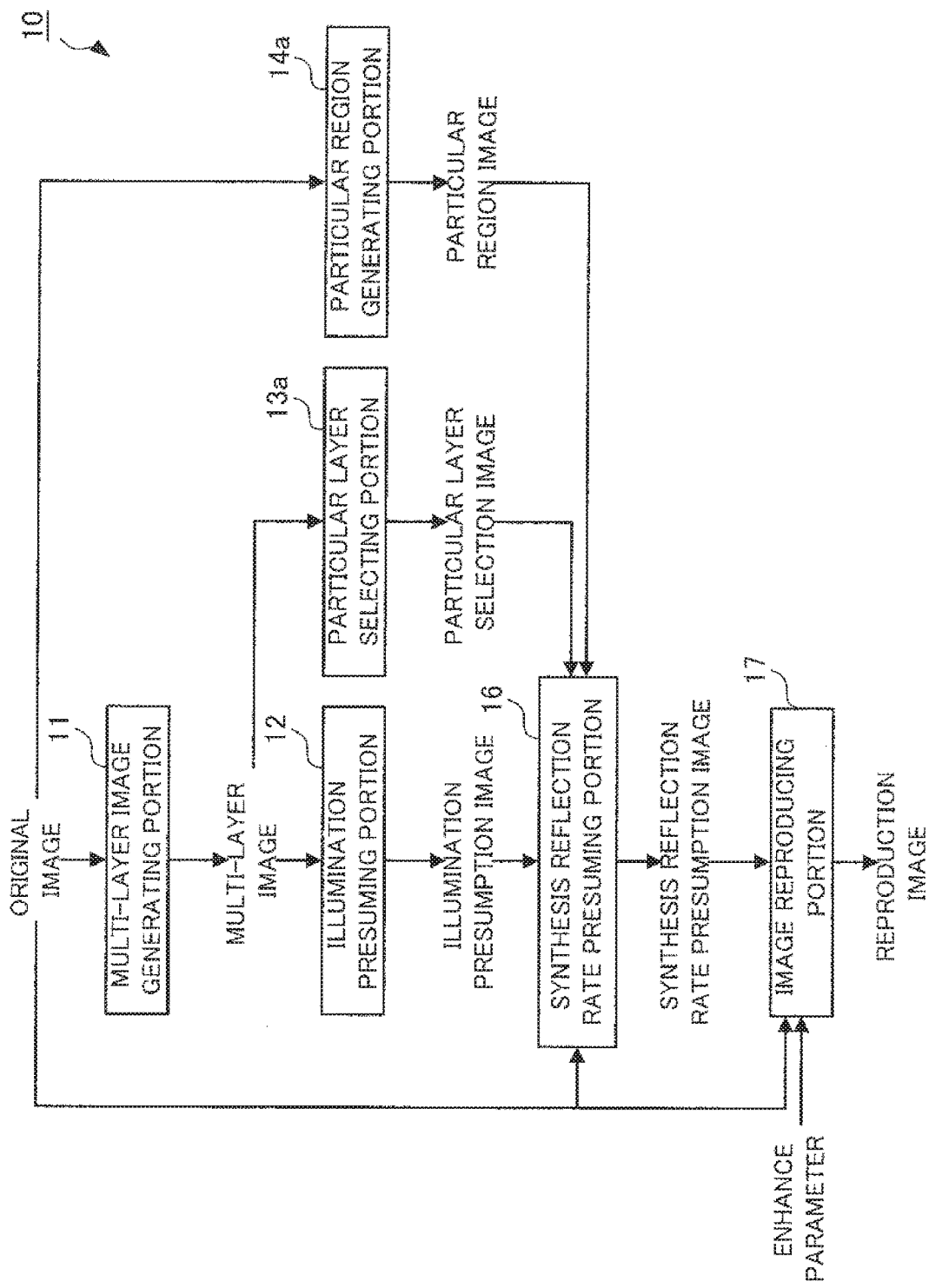
FIG. 14 is a block diagram showing a functional configuration of an image processor in the second exemplary embodiment of the present invention.

FIG. 14 is a block diagram showing a functional configuration of an image processor 10 in the second exemplary embodiment of the present invention. In the first exemplary embodiment, it is effective in the region where the noise is easily generated in accordance with brightness as in the dark sections. In the second exemplary embodiment, it is not only effective in the dark sections, but also effective in color regions where the noise should be suppressed such as human's skin and the like. As shown in the figure, the image processor 10 in the second exemplary embodiment includes; a multi-layer image generating portion 11, an illumination presuming portion 12, a particular layer selecting portion 13a, a particular region generating portion 14a, a synthesis reflection rate presuming portion 16, and an image reproducing portion 17. Among these, the multi-layer image generating portion 11, the illumination presuming portion 12, the particular layer selecting portion 13a and the image reproducing portion 17 are the same as those in the first exemplary embodiment, thus the explanation thereof will be omitted. Hereinafter, the explanation of the particular region generating portion 14a and the synthesis reflection rate presuming portion 16 will be given.

The particular region generating portion 14a generates, from the original image, a particular region image which represents a region (a particular region) having color in which the noise should be suppressed. For example, in the case of the color of humans' skin, a statistically acquired center of the color region (representative color) is figured out as what represents the color of humans' skin in color space. Further, the particular region generating portion 14a generates a mask image which masks the original image by setting the weights according to distances from the representative-color to the pixel values of the respective pixels of the original image to be the pixel values of the pixels corresponding to the respective pixels, and the mask image is set to be the particular region image.

Figure 15:
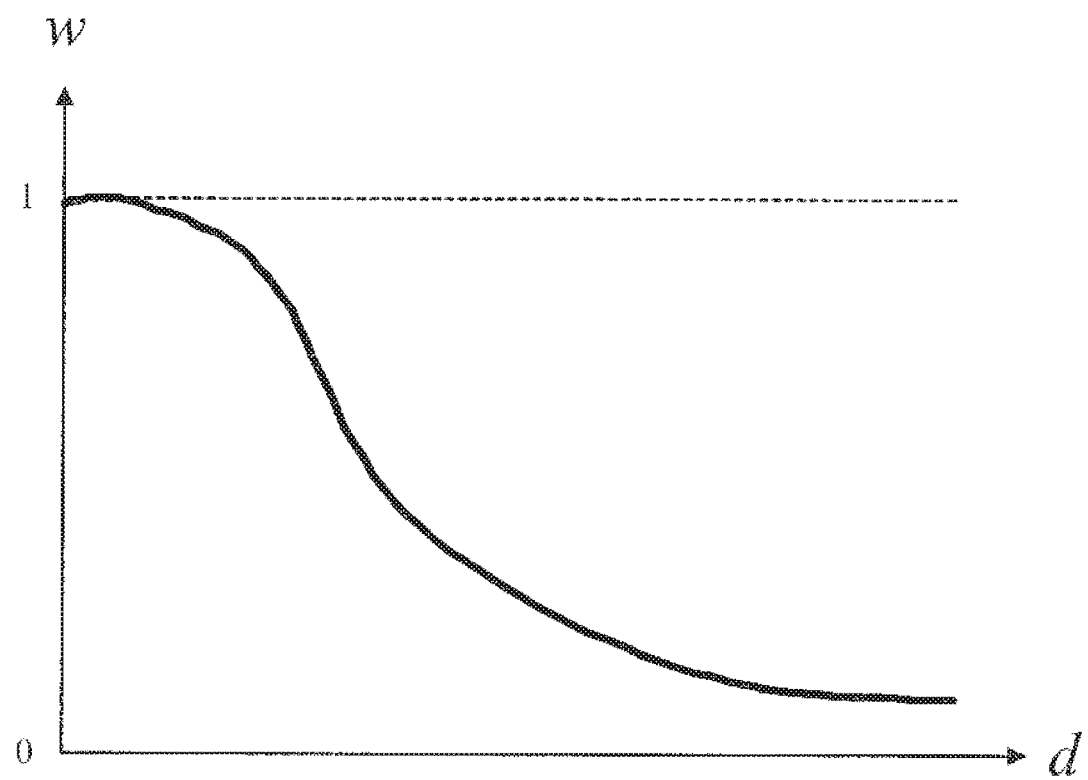
FIG. 15 is a graph showing a function defining a distance-weight used in the second exemplary embodiment of the present invention.

In this case, when a distance from the representative color to the pixel values of the respective pixels are regarded as d, the distance-weight w may be a value determined by the function as shown in FIG. 15. As the function shown in FIG. 15, the formula described below may be applied in which the distance-weight w(x, y) is expressed by regarding a distance from a representative color to a pixel value I(x, y) of a pixel as d(x, y).

$$w(x, y) = \frac{1}{1 + \left(\frac{d(x, y)}{d_{inf}}\right)^p} \quad \text{(Formula 10)}$$

Figure 16A:
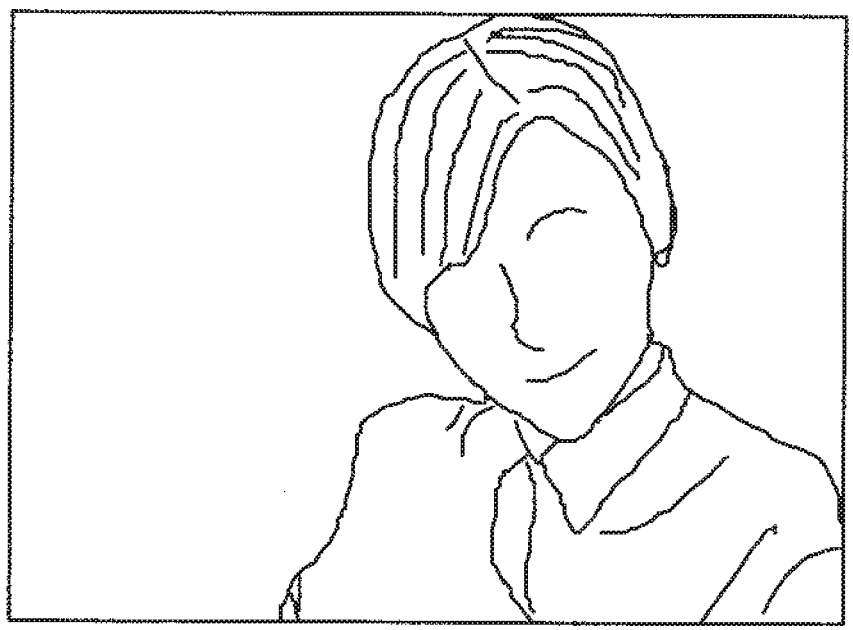
FIGS. 16A and 16B are diagrams showing a specific example of an image used in the second exemplary embodiment of the present invention and a specific example of a particular region image corresponding to the specific example of the image.
Figure 16B:
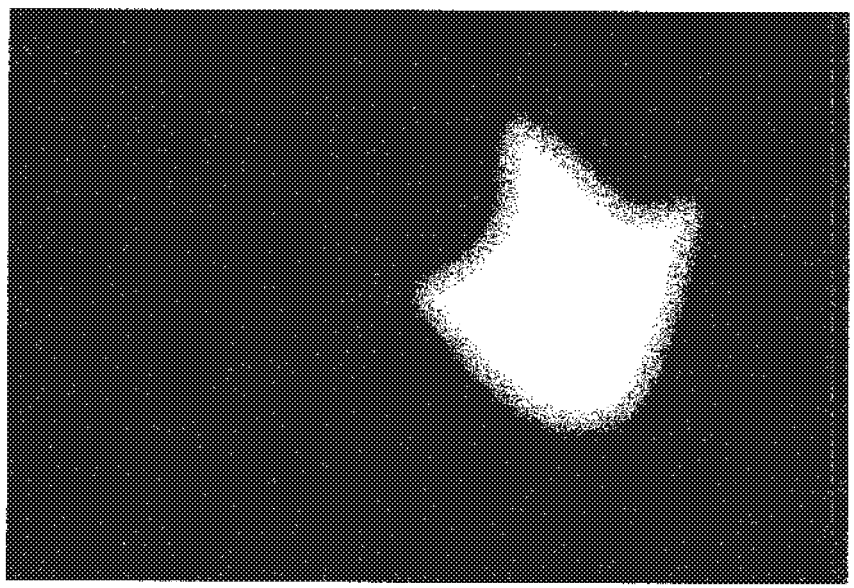

Here, $d_{inf}$ represents an inflection point of the function, and p represents a parameter for controlling the maximum gradient. Since d(x, y) is calculated in accordance with a color space, the calculation of a distance from a representative color may be performed in any color space; RGB color space, color space composed of CbCr, or the like. Otherwise, a region may be specified with color data disclosed in Japanese Patent Application Laid-open Publication No. 2006-155595, or the region specifying method written in Japanese Patent Application Laid-open Publication No. 2003-248824 may be used. Such a generation of the particular region image is shown in FIG. 16A and FIG. 16B. In other words, in the case where the image is the one shown in FIG. 16A, the particular region image shown in FIG. 16B is generated.

In the present exemplary embodiment, the particular region image is used as an example of a region image that represents a region of color inside the designated color region in the original image, and the particular region generating portion 14a is provided as an example of a region image generating unit that generates the region image.

The synthesis reflection rate presuming portion 16 performs a calculation as shown below assuming that, in the particular region image generated by the particular region generating portion 14a, the region corresponding to w(x, y) represents the region except for the particular region in the case where w(x, y) is 0 while the region corresponding to w(x, y) represents the particular region as w(x, y) gets closer to 1.

$$R(x, y) = \frac{(1 - w(x, y))I(x, y) + w(x, y)L^{NR}(x, y)}{L(x, y)} \quad \text{(Formula 11)}$$

In this formula 11, w(x, y) is different from w in the first exemplary embodiment, however, w(x, y) is equivalent to the synthesis parameter (synthesizing degree information) in the first exemplary embodiment.

Figure 17:
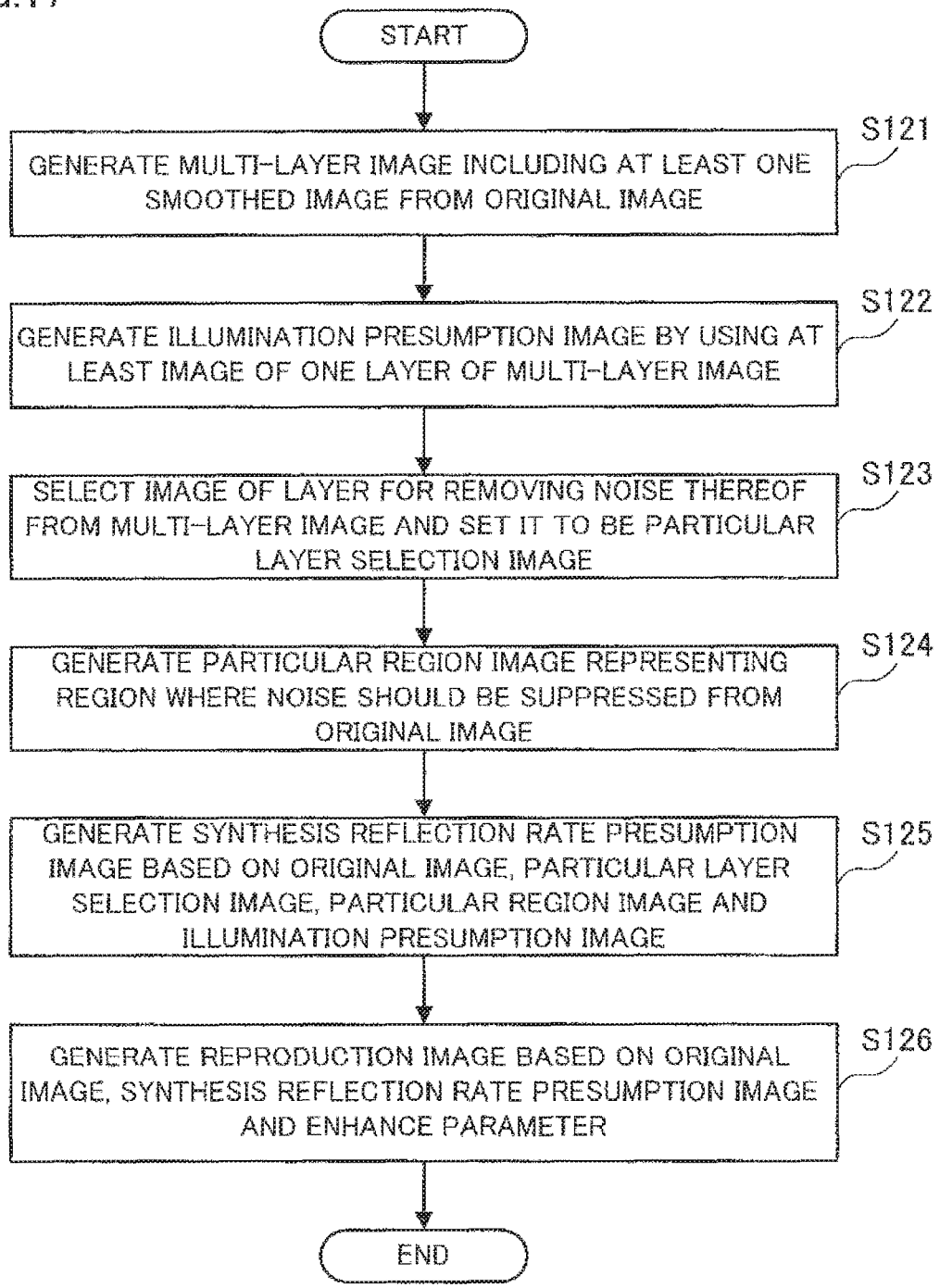
FIG. 17 is a flowchart showing an operation example of the image processor in the second exemplary embodiment of the present invention.

FIG. 17 is a flowchart showing an operation example of the image processor 10 in the second exemplary embodiment of the present invention.

When the original image is inputted, firstly, the multi-layer image generating portion 11 generates a multi-layer image including at least one smoothed image from the original image as shown in FIG. 2 and FIG. 4 (step 121).

Next, the illumination presuming portion 12 generates the illumination presumption image by using at least an image of one layer of the multi-layer image generated in step 121 as shown in FIG. 5 to FIG. 7 (step 122). Moreover, the particular layer selecting portion 13a selects a layer for removing the noise thereof from the multi-layer image generated in step 121, and sets the selected layer to be the particular layer selection image as shown in FIG. 8 to FIG. 10 (step 123). Further, the particular region generating portion 14a generates, from the original image, the particular region image representing the region where the noise should be suppressed (step 124). Herein, step 122, step 123 and step 124 are performed in this order, however, they may be performed in any orders. Otherwise, at least two steps out of step 122, step 123 and step 124 may be performed in parallel.

Subsequently, the synthesis reflection rate presuming portion 16 generates the synthesis reflection rate presumption image based on the original image, the particular layer selection image selected in step 123, the particular region image generated in step 124, and the illumination presumption image generated in step 122 (step 125).

Lastly, the image reproducing portion 17 generates the reproduction image based on the original image, the synthesis reflection rate presumption image generated in step 125 and the enhance parameter (step 126). Note that, herein, the original image is used by assuming the case of generating the reproduction image by applying Formula 7, however, in the case of generating the reproduction image by applying Formula 8, the original image may not be used in step 126.

Third Exemplary Embodiment

Figure 18:
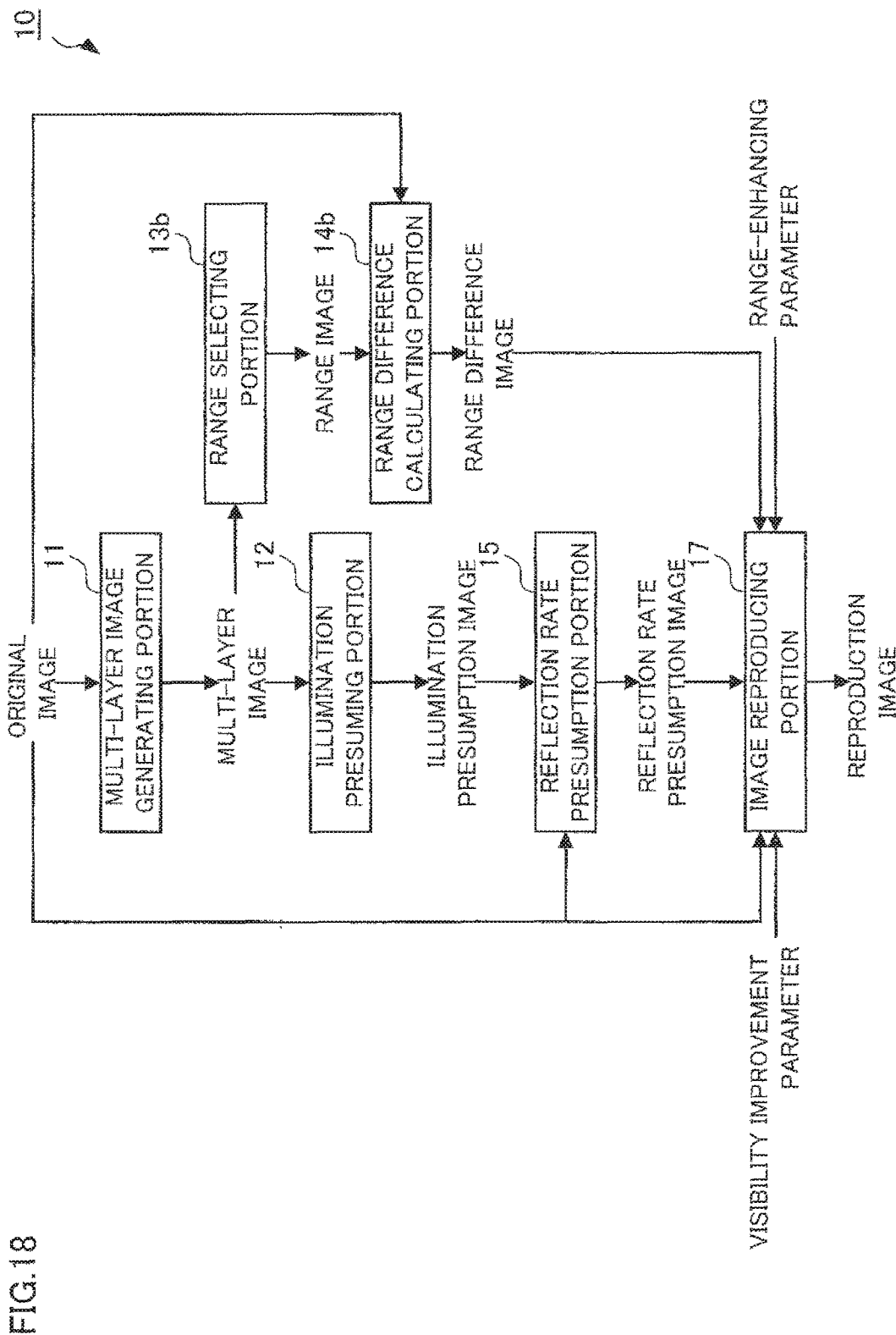
FIG. 18 is a block diagram showing a functional configuration of an image processor in the third exemplary embodiment of the present invention.

FIG. 18 is a block diagram showing a functional configuration of an image processor 10 in the third exemplary embodiment of the present invention. As shown in the figure, the image processor 10 in the third exemplary embodiment includes; a multi-layer image generating portion 11, an illumination presuming portion 12, a range selecting portion 13*b*, a range difference calculating portion 14*b*, a reflection rate presumption portion 15, and an image reproducing portion 17.

The multi-layer image generating portion 11 mainly executes a processing of generating a smoothed image by smoothing the original image. This processing is executed for the presumption of a reflection rate described later and enhancing range. Smoothness is explained in the first exemplary embodiment, thus the explanation thereof will be omitted.

The illumination presuming portion 12 is also explained in the first exemplary embodiment, thus the explanation thereof will be omitted.

Figure 19:
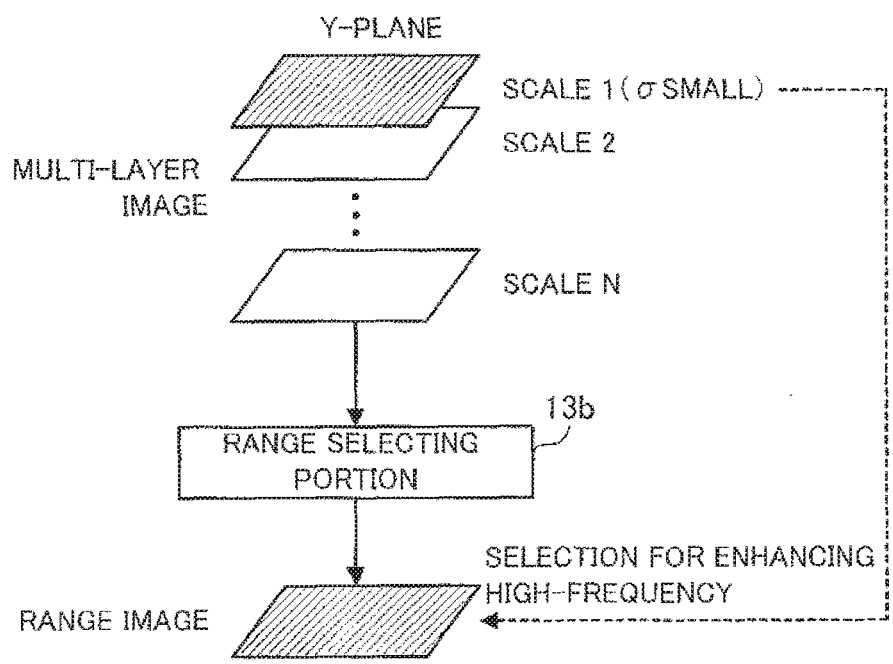
FIG. 19 is a diagram showing a selection state of a range image by a range selecting portion in the case where a high-frequency side is enhanced.
Figure 20:
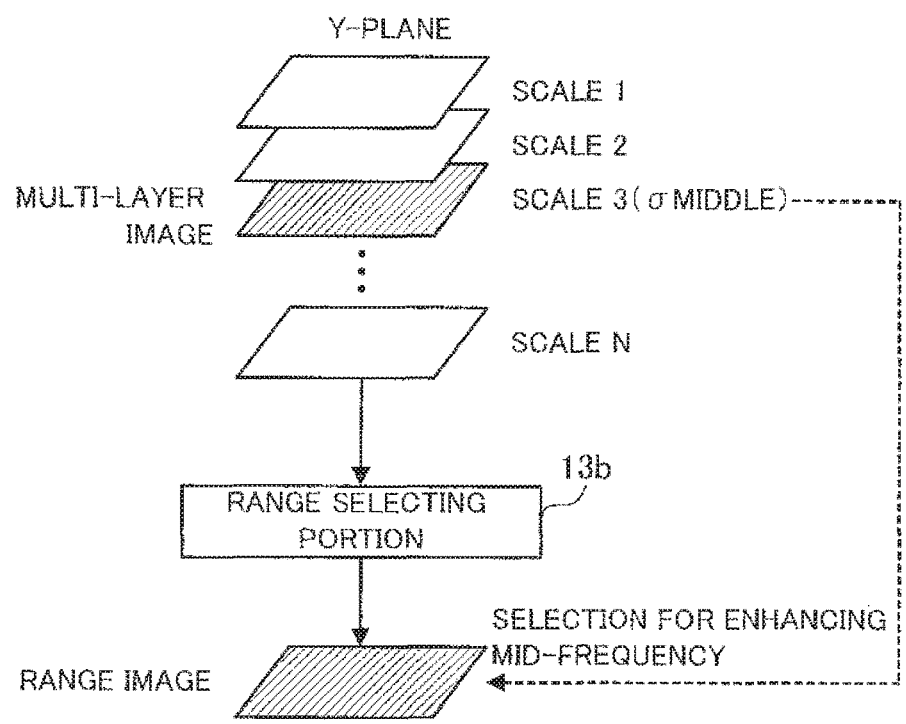
FIG. 20 is a diagram showing a selection state of a range image by a range selecting portion in the case where a mid-frequency side is enhanced.

The range selecting portion 13*b* selects a smoothed image from the multi-layer image to use for range-enhancing and sets the smoothed image to be a range image. As shown in FIG. 19 with slash-hutching, the range selecting portion 13*b* selects a layer which has a smaller σ from the multi-layer image in the case of enhancing the high-frequency side. However, when the range selecting portion 13*b* selects a layer which has a larger σ from the multi-layer image as shown in FIG. 20 with slash-hatching, a layer for enhancing the mid-frequency side is selected. Note that, in both of FIG. 19 and FIG. 20, σ gets larger in the order of the scale 1, the scale 2, . . . , the scale N.

In the case where an image for enhancing the high frequency side is selected by the range selecting portion 13*b*, the image has clear texture because the enhancement of the image becomes an edge enhancing. However, in the case where an image for enhancing the mid-frequency side is selected by the range selecting portion 13*b*, the shape itself is enhanced because contours in the image are enhanced with wider regions. In other words, as σ gets larger, the object itself gets more enhanced.

Moreover, in FIGS. 19 and 20, an example of a multi-layer image configured with one plane of brightness components is explained, however, in the case of being configured with three planes of RGB, the processing of the range selecting portion 13*b* can be executed. In this case, the processing of FIG. 19 and FIG. 20 is executed on installments of three planes.

Note that, it is described above that the range selecting portion 13*b* selects one layer from the multi-layer image generated by the multi-layer image generating portion 11 and the selected layer is set to be a range image, however, it is not limited thereto. For example, the range selecting portion 13*b* selects images in plural layers from the multi-layer image generated by the multi-layer image generating portion 11, and may generate the range image from the images in the plural layers. Otherwise, a range image generating portion which generates a range image from the original image may be provided, instead of the range selecting portion 13*b* which selects a range image from the multi-layer image generated by the multi-layer image generating portion 11. In this manner, the range selecting portion 13*b* is regarded as a unit acquiring the range image.

In the present exemplary embodiment, the range image is used as an example of a particular smoothed image in which the original image is smoothed with a smoothing degree for enhancing a designated range, and the range selecting portion 13*b* is provided as an example of a smoothed image acquiring unit that acquires the particular smoothed image.

The range difference calculating portion 14*b* calculates the differences between the pixel values of the original image and the pixel values of the range image selected in accordance with the range to enhance as described above, thereby, generates the range difference image in which the differences of the pixel values are set to be pixel values.

In the present exemplary embodiment, the range difference image is used as an example of a difference image which is the difference between the original image and the particular smoothed image, and the range difference calculation portion 14*b* is provided as an example of a difference image generation unit that generates the difference image.

The reflection rate presumption portion 15 presumes the reflection rate of the original image by calculating the degree of the pixel values of the original image to the pixel values of the illumination presumption image. Specifically, the image represents the reflection rate (hereinafter, referred to as "a reflection rate presumption image") is figured out as below.

$$R(x, y) = \frac{I(x, y)}{L(x, y)} \quad \text{(Formula 12)}$$

Here, R(x, y) represents a pixel value of the reflection rate presumption image, I(x, y) represents a pixel value of the original image, and L(x, y) represents a pixel value of the illumination presumption image. Note that, in the case where the illumination presumption image is respectively calculated for the three planes of RGB, Formula 12 is interpreted to have R(x, y) for each of three planes of RGB. Moreover, in the case of applying only brightness components (Y of YCbCr, L of L*a*b*, or V of HSV), Formula 12 is applied for one plane.

In the present exemplary embodiment, the reflection rate presumption image is used as an example of a reflection rate image in which the reflection rate components of the original image based on the original image and the illumination image are set to be the pixel values, and the reflection rate presumption portion 15 is provided as an example of a reflection rate image generating unit that generates the reflection rate image based on the original image and the illumination image.

The image reproducing portion 17 executes a processing of enhancing the reflection rate components based on the original image and the reflection rate presumption image generated by the reflection rate presumption portion 15. In the present exemplary embodiment, both of the improvement of visibility and the improvement of texture are performed, for example, the reproduction image is generated by the reproduction formula as below.

$$\hat{I}(x,y) = \alpha(R(x,y) + \beta(I(x,y) - L^S(x,y))) + (1-\alpha)I(x,y) \quad \text{(Formula 13)}$$

Here, Î(x, y) represents a pixel value of the reproduction image, $L^S$(x, y) represents a pixel value of the range image, I(x, y)-$L^S$(x, y) represents a pixel value of the range difference image. Moreover, α is a parameter that represents the degree of visibility improvement and corresponds to the visibility improvement parameter (reflection rate enhancing degree information) in FIG. 18. Further, β is a parameter that represents a gain of the range-enhancing and corresponds to the range-enhancing parameter (range-enhancing degree information) in FIG. 18. Î(x, y) is the reflection rate and the enhancing of the range components themselves in the case of α=1, and Î(x, y) is a pixel value of the original image in the case of α=0. In the exemplary embodiment, α may be any value from 0 to 1. Note that, a hat sign is attached at the top of a symbol in a formula, however, it is attached at the right side of a symbol in this specification.

Moreover, the reproduction formula is not limited to Formula 13, and the reproduction formula may be as described below.

$$\hat{I}(x,y) = \alpha \log(R(x,y)) + \beta(I(x,y) - L^s(x,y)) + \text{const} \quad \text{(Formula 14)}$$

Here, α is a parameter representing a gain of the reflection rate, and corresponds to the visibility improvement parameter (reflection rate enhancing degree information) in FIG. 18. In the study field, log represents a visibility feature, however, in the image processing, log functions as gain. Further, β is a parameter representing a gain of the range-enhancing, and corresponds to the range-enhancing parameter (range-enhancing degree information) in FIG. 18. Moreover, const is a constant representing an intercept of the reproduction formula. FIG. 18 shows the case where the image reproducing portion 17 generates the reproduction image by using the original image, but in the case of applying Formula 14, the image reproducing portion 17 generates the reproduction image without using the original image.

Note that, in the present exemplary embodiment, it is described that the image reproducing portion 17 reproduces an image by applying Formula 13 or Formula 14, however, the image may be reproduced by applying any formula as long as the essence of the present invention is not lost.

In the present exemplary embodiment, the image reproducing portion 17 is provided as an example of a reproduction image generating unit that generates the reproduction image based on at least the reflection rate image, the reflection rate enhancing degree information, the difference image, and the range enhancing degree information.

Moreover, in the present exemplary embodiment, the processing portion configured with the reflection rate presumption portion 15 and the image reproducing portion 17 is an example of an image generation processing unit that executes a processing for generating the reproduction image reproduced so that visibility of the original image is improved.

Figure 21:
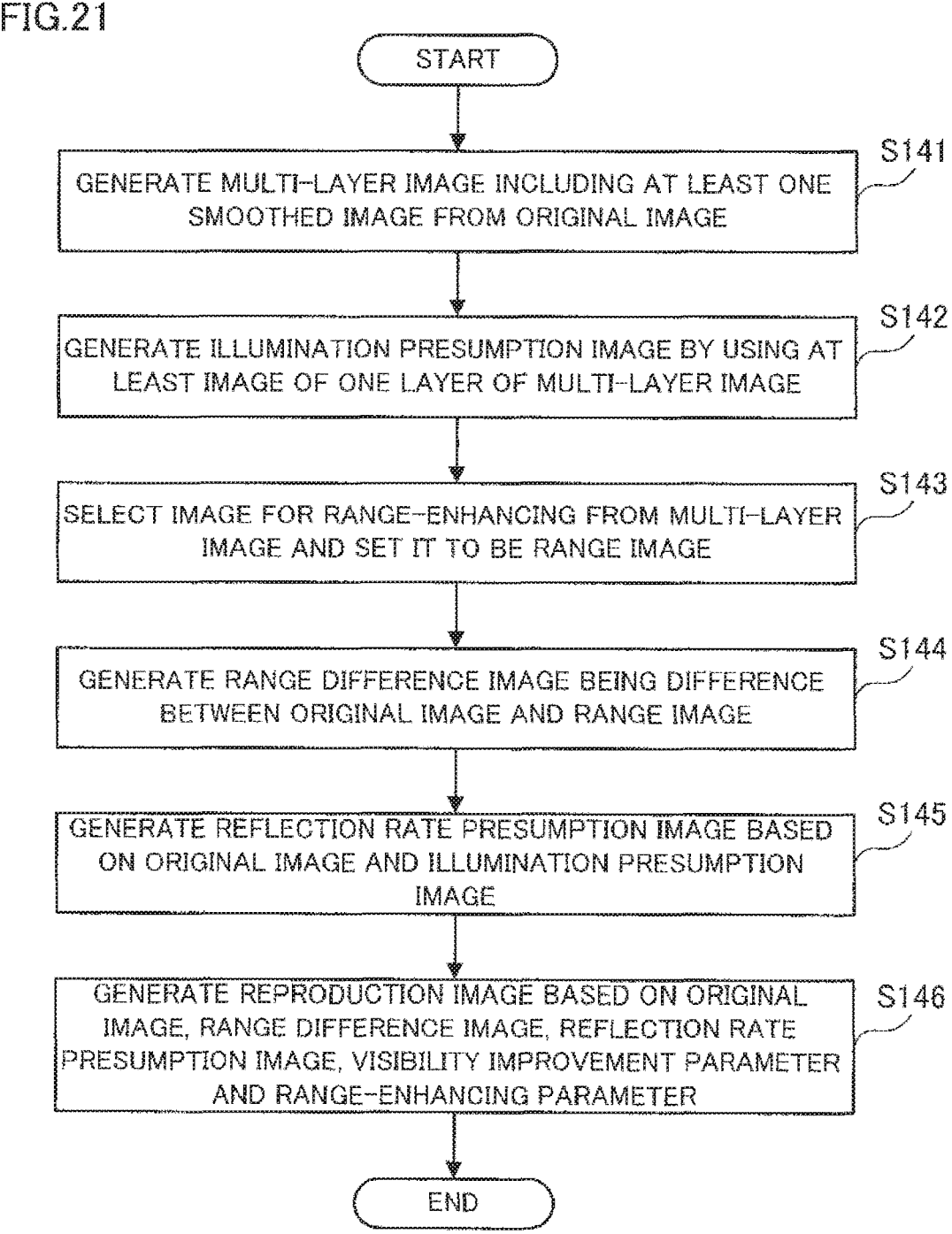
FIG. 21 is a flowchart showing an operation example of the image processor in the third exemplary embodiment of the present invention.

FIG. 21 is a flowchart showing an operation example of the image processor 10 in the third exemplary embodiment of the present invention.

When the original image is inputted, firstly, the multi-layer image generating portion 11 generates a multi-layer image including at least one smoothed image from the original image as shown in FIG. 2 and FIG. 4 (step 141).

Next, the illumination presuming portion 12 generates the illumination presumption image by using at least an image of one layer of the multi-layer image generated in step 141 as shown in FIG. 5 to FIG. 7 (step 142). Moreover, the range selecting portion 13b selects a layer for range-enhancing from the multi-layer image generated in step 141, and sets the selected layer to be the range image as shown in FIG. 19 to FIG. 20 (step 143). Subsequently, the range difference calculation portion 14b generates the range difference image which is difference between the original image and the range image (step 144). On the other hand, the reflection rate presumption portion 15 generates the reflection rate presumption image based on the original image and the illumination presumption image generated in step 142 (step 145). Herein, step 142 to step 145 are performed in this order, however, they may be performed in any orders as long as step 145 is performed after step 142 and step 144 is performed after step 143. Otherwise, at least any one of step 142 and step 145, and at least any one of step 143 and step 144 may be performed in parallel.

Lastly, the image reproducing portion 17 generates the reproduction image based on the original image, the range difference image generated in step 144, the reflection rate presumption image generated in step 145, the visibility improvement parameter, and the range-enhancing parameter (step 146). Note that, herein, the original image is used by assuming the case of generating the reproduction image by applying Formula 13, however, in the case of generating the reproduction image by applying Formula 14, the original image may not be used in step 145.

Fourth Exemplary Embodiment

Figure 22:
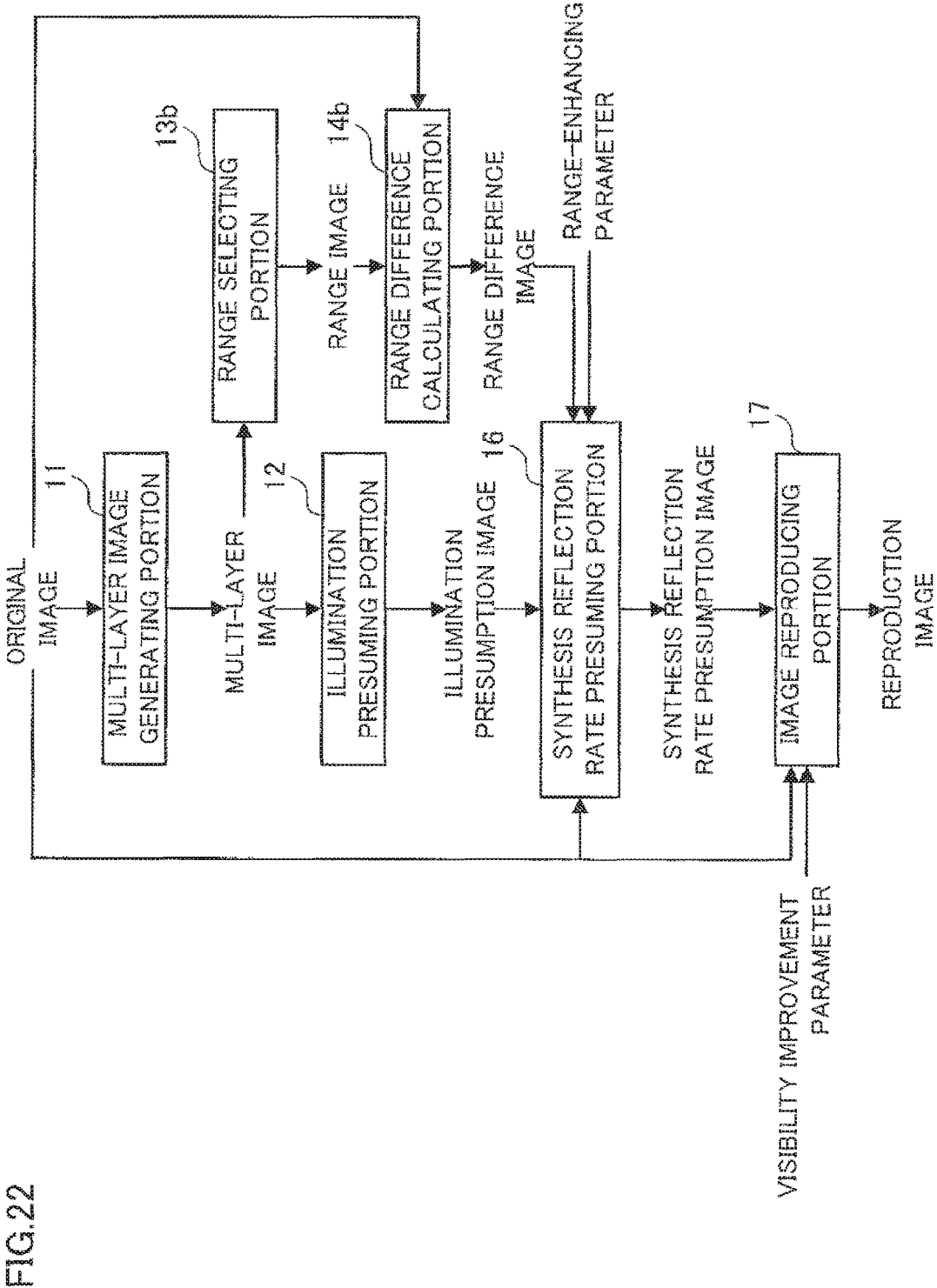
FIG. 22 is a block diagram showing a functional configuration of an image processor in the fourth exemplary embodiment of the present invention.

FIG. 22 is a block diagram showing a functional configuration of an image processor 10 in the fourth exemplary embodiment of the present invention. As shown in the figure, the image processor 10 in the fourth exemplary embodiment includes; a multi-layer image generating portion 11, an illumination presuming portion 12, a range selecting portion 13b, a range difference calculating portion 14b, a synthesis reflection rate presuming portion 16, and an image reproducing portion 17. Among these, the multi-layer image generating portion 11, the illumination presuming portion 12, the range selecting portion 13b and the range difference calculating portion 14b are the same as those in the third exemplary embodiment, thus the explanation thereof will be omitted. Hereinafter, the explanation of the synthesis reflection rate presuming portion 16 and the image reproducing portion 17 will be given.

The synthesis reflection rate presuming portion 16 calculates the reflection rate components in which the enhancing range is considered. Specifically, the image representing the reflection rate synthesized with the range difference image (hereinafter, referred to as "synthesis reflection rate presumption image") as below is acquired.

$$R(x, y) = \frac{I(x, y) + \beta(I(x, y) - L^S(x, y))}{L(x, y)} \quad \text{(Formula 15)}$$

Here, I(x, y), L(x, y), $L^S$(x, y), I(x, y)-$L^S$(x, y) are the same as those explained in the third exemplary embodiment. Moreover, R(x, y) is a pixel value of the synthesis reflection rate presumption image. Moreover, β is a parameter that represents a gain of the range-enhancing, and corresponds to the range-enhancing parameter (a range-enhancing degree information) in FIG. 22.

In the present exemplary embodiment, the synthesis reflection rate presumption image is used as an example of a reflection rate image in which the reflection rate components of the original image, which are based on the original image, the illumination image, the difference image, and the range enhancing degree information, are regarded as the pixel values, and the synthesis reflection rate presuming portion 16 is provided as an example of a reflection rate image generating unit that generates the reflection rate image based on the original image, the illumination image, the difference image, and the range-enhancing degree information.

The image reproducing portion 17 performs the visibility improvement by using the synthesis reflection rate presumption image calculated as below.

$$\hat{I}(x,y)=\alpha R(x,y)+(1-\alpha)I(x,y) \quad \text{(Formula 16)}$$

Here, $\hat{I}(x, y)$ represents the pixel value of the reproduction image. Moreover, α is a parameter that represents the degree of visibility improvement and corresponds to the visibility improvement parameter (reflection rate enhancing degree information) in FIG. 22. In the case of α=1, $\hat{I}(x, y)$ is the reflection rate itself, and in the case of α=0, $\hat{I}(x, y)$ is the pixel value of the original image. In the exemplary embodiment, α may be any value from 0 to 1.

Moreover, the reproduction formula is not limited to Formula 16, and the reproduction formula may be as described below.

$$\hat{I}(x,y)=\alpha \log(R(x,y))+\text{const} \quad \text{(Formula 17)}$$

Here, α is a parameter that represents a gain of the reflection rate, and corresponds to the visibility improvement parameter (reflection rate enhancing degree information) in FIG. 22. In the study field, log represents a visibility feature, however, log functions as gain in the image processing. Further, const is a constant that represents an intercept of the reproduction formula. FIG. 18 shows the case where the image reproducing portion 17 generates the reproduction image by using the original image, however, in the case of applying Formula 17, the image reproducing portion 17 generates the reproduction image without using the original image.

Note that, in the present exemplary embodiment, it is described that the image reproducing portion 17 reproduces an image by applying Formula 16 or Formula 17, but the image may be reproduced by applying any formula as long as the essence of the present invention is not lost.

In the present exemplary embodiment, the image reproducing portion 17 is provided as an example of a reproduction image generating unit that generates the reproduction image based on at least the reflection rate image and the reflection rate enhancing degree information.

Moreover, in the present exemplary embodiment, the processing portion configured with the reflection rate presumption portion 15 and the image reproduction portion 17 is an example of image generation processing unit that executes the processing for generating the reproduction image reproduced so that the visibility of the original image is improved.

Figure 23:
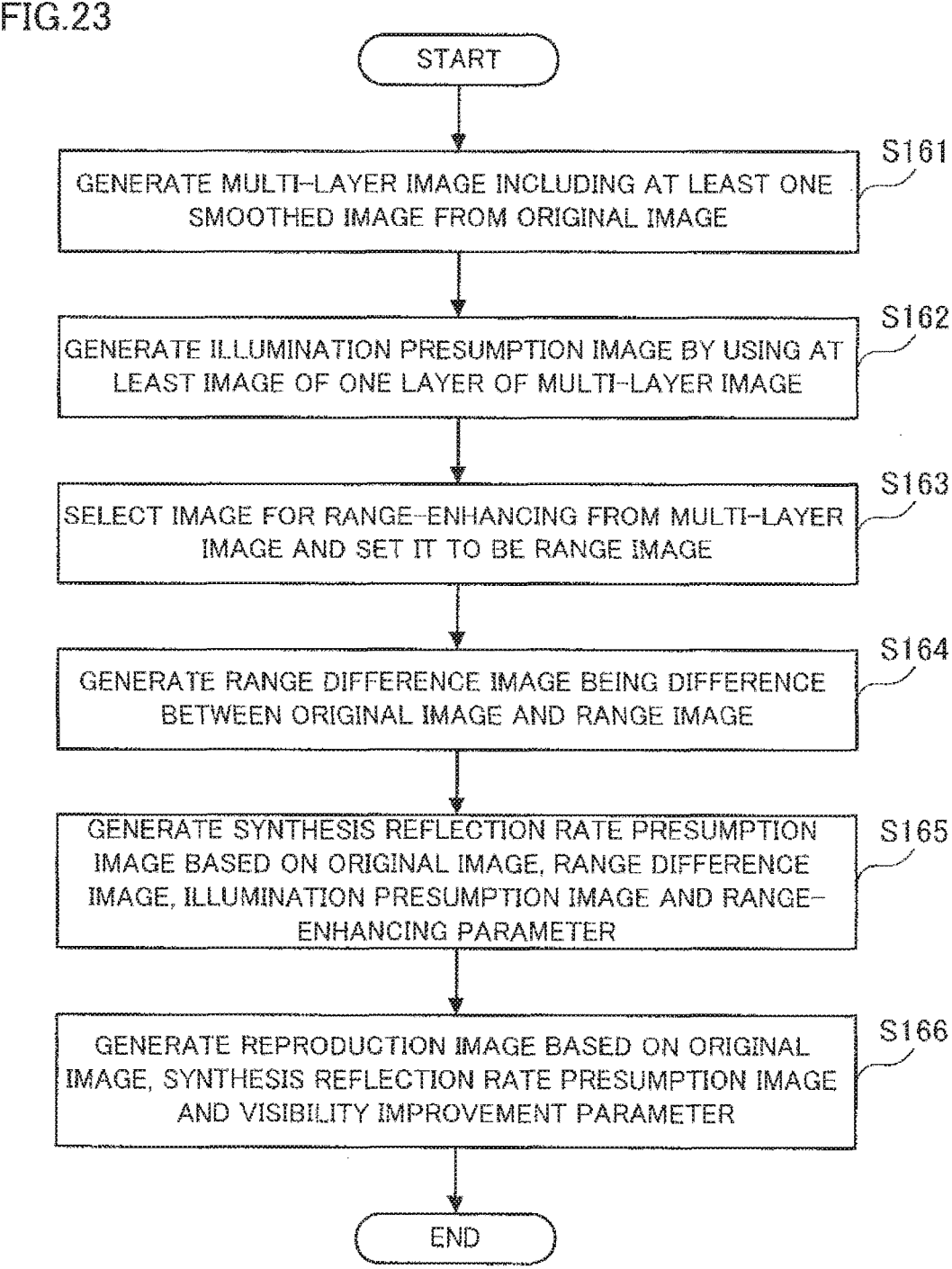
FIG. 23 is a flowchart showing an operation example of the image processor in the fourth exemplary embodiment of the present invention.

FIG. 23 is a flowchart showing an operation example of the image processor 10 in the fourth exemplary embodiment of the present invention.

When the original image is inputted, firstly, the multi-layer image generating portion 11 generates a multi-layer image which contains at least one smoothed image from the original image as shown in FIG. 2 and FIG. 4 (step 161).

Next, the illumination presuming portion 12 generates the illumination presuming image by using at least an image of one layer of the multi-layer image generated in step 161 as shown in FIG. 5 to FIG. 7 (step 162). Moreover, the range selecting portion 13b selects a layer for enhancing the range from the multi-layer image generated in step 161, and sets the selected layer to be the range image as shown in FIG. 19 to FIG. 20 (step 163). Further, the range difference calculation portion 14b generates the range difference image which is the difference between the original image and the range image (step 164). Herein, step 162, step 163 and step 164 are performed in this order, however, they may be performed in any orders as long as step 164 is performed after step 163. Otherwise, step 162 and at least any one of step 163 and step 164 may be performed in parallel.

Subsequently, the synthesis reflection rate presuming portion 16 generates the synthesis reflection rate presumption image based on the original image, the range difference image generated in step 164, the illumination presumption image generated in step 162 and the range-enhancing parameter (step 165).

Lastly, the image reproducing portion 17 generates the reproduction image based on the original image, the synthesis reflection rate presumption image generated in step 165 and the visibility improvement parameter (step 166). Note that, herein, the original image is used by assuming the case of generating the reproduction image by applying Formula 16, however, in the case of generating the reproduction image by applying Formula 17, the original image may not be used in step 166.

[Hardware Configuration of Image Processor]

The image processor 10 in the present exemplary embodiment is realized, for example, as an image processing software that is installed in a personal computer, however, typically realized as the image processor 10 that performs an image reading and an image formation.

Figure 24:
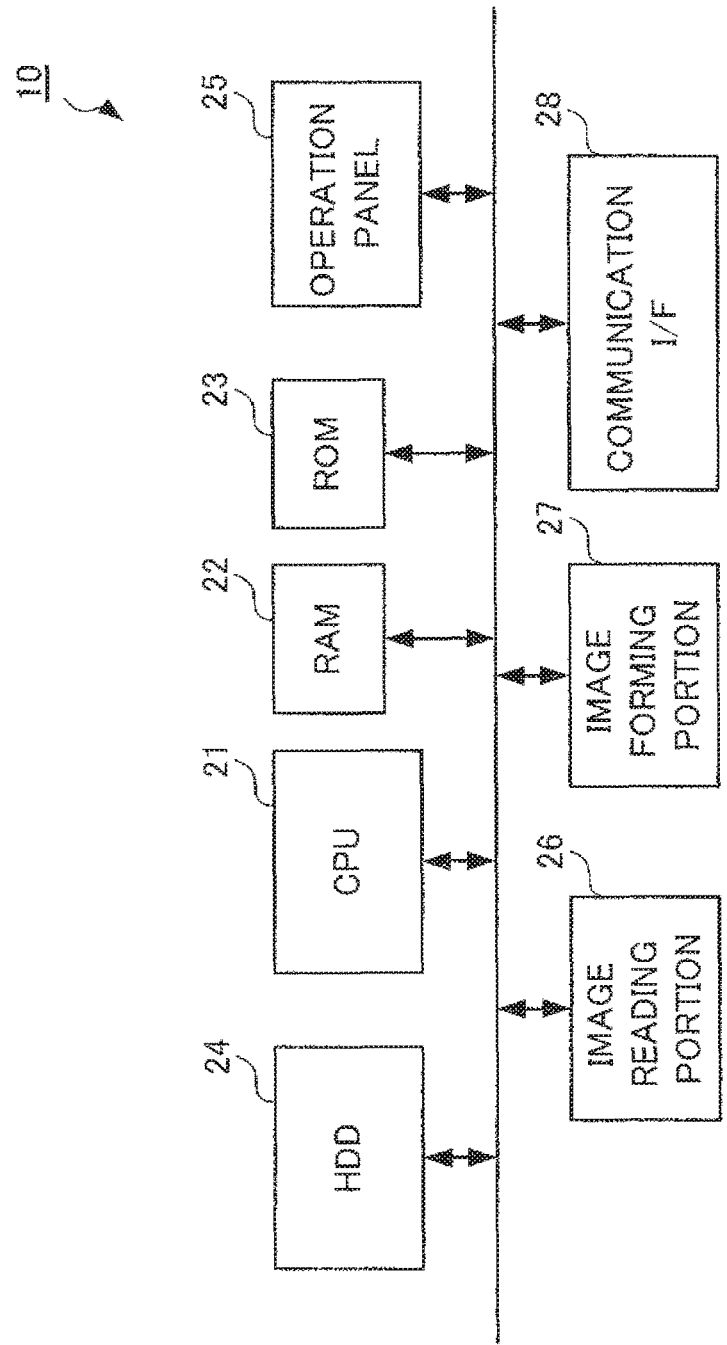
FIG. 24 is a block diagram showing a hardware configuration example of the image processor in the present exemplary embodiment of the present invention.

FIG. 24 is a block diagram showing a hardware configuration example of the image processor 10. As shown in the figure, the image processor 10 includes a Central Processing Unit (CPU) 21, a Random Access Memory (RAM) 22, a Read Only Memory (ROM) 23, a Hard Disk Drive (HDD) 24, an operation panel 25, an image reading portion 26, and image forming portion 27 and a communication interface (hereinbelow, refer to as "communication I/F") 28.

The CPU 21 loads various programs stored in the ROM 23 or the like into the RAM 22, and then executes the programs, thereby to implement functions to be described later.

The RAM 22 is a memory that is used as a working memory or the like for the CPU 21.

The ROM 23 is a memory that stores, therein, the various programs executed by the CPU 21.

The HDD 24 is, for example, a magnetic disk device that stores, therein, image data having been read by the image reading portion 26, image data used for image formation in the image forming portion 27, and the like.

The operation panel 25 is, for example, a touch panel that displays various kinds of information and receives an operation input by a user. Here, the operation panel 25 is configured with a display that displays various kinds of information and a position detecting sheet that detects a position designated by a finger, a stylus pen or the like.

The image reading portion 26 reads an image recorded on a recording medium such as paper. The image reading portion 26 herein is, for example, a scanner. The scanner to be used may employ one of the following two systems: a CCD system in which reflected light of light emitted from a light source and directed at an original is reduced by a lens and is then received by charge coupled devices (CCD); and a CIS system in which reflected light of light beams sequentially emitted from LED light sources and directed at an original is received by a contact image sensor (CIS).

The image forming portion 27 forms an image on a recording medium. The image forming portion 27 herein is, for example, a printer. The printer to be used may employ one of the following two systems: an electrophotographic system in which an image is formed by transferring toner attached to a photoconductive drum onto a recording medium; and an ink jet system in which an image is formed by ejecting ink onto a recording medium.

The communication I/F 28 transmits and receives various kinds of information to and from other devices through a network.

The program that achieves the present exemplary embodiment may be provided not only by a communication unit but also by being stored in a recording medium such as a CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment as chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processor comprising:
    at least one processor configured to execute:
        an image group generating unit that generates, from an original image, a group of images including at least one smoothed image which is the original image smoothed with at least one smoothing degree;
        an illumination image generating unit that generates an illumination image in which an illumination component of the original image is set to be a pixel value by use of at least one of the images included in the group of images;
        a smoothed image acquiring unit that acquires a particular smoothed image which is the original image smoothed with smoothing degree for enhancing a designated range, based on the at least one smoothed image;
        a difference image generating unit that generates a difference image which is a difference between the original image and the particular smoothed image,
        a reflection rate image generating unit that generates a reflection rate image in which a reflection rate component of the original image is set to be a pixel value, using a ratio of a synthesis of the original image, the difference image, and a range enhancing degree information which represents an enhancing degree of the range, to the illumination image; and
        a reproduction image generating unit that generates a reproduction image which is reproduced so that visibility of the original image is enhanced, based on at least the reflection rate image and a reflection rate enhancing degree information which represents an enhancing degree of the reflection rate component of the original image.

2. The image processor according to claim 1, wherein the illumination image generating unit presumes an illumination component of the original image by calculating a weighted sum of a pixel value of a plurality of the smoothed images included in the group of images.

3. The image processor according to claim 1, wherein,
    the image group generating unit generates the group of images including the original image, and
    the illumination image generating unit presumes an illumination component of the original image with quadratic programming using the original image.

4. The image processor according to claim 1, wherein the smoothed image acquiring unit acquires the particular smoothed image by selecting the particular smoothed image from the at least one smoothed image.

5. A non-transitory computer readable medium storing a program causing a computer to execute a process for controlling an image processor, the process comprising:
    generating, from an original image, a group of images including at least one smoothed image which is the original image smoothed with at least one smoothing degree;
    generating an illumination image in which an illumination component of the original image is set to be a pixel value by using at least one of the images included in the group of the image;
    acquiring a particular smoothed image which is the original image smoothed with smoothing degree for enhancing a designated range, based on the at least one smoothed image;
    generating a difference image which is a difference between the original image and the particular smoothed image;
    generating a reflection rate image in which a reflection rate component of the original image is set to be a pixel value, using a ratio of a synthesis of the original image, the difference image, and a range enhancing degree information which represents an enhancing degree of the range, to the illumination image; and
    generating a reproduction image which is reproduced so that visibility of the original image is enhanced, based on at least the reflection rate image and a reflection rate enhancing degree information which represents an enhancing degree of the reflection rate component of the original image.

* * * * *